United States Patent
Ichikawa et al.

(10) Patent No.: US 7,795,844 B2
(45) Date of Patent: Sep. 14, 2010

(54) POWER SUPPLY SYSTEM, VEHICLE WITH THE SAME AND TEMPERATURE MANAGING METHOD

(75) Inventors: Shinji Ichikawa, Toyota (JP); Tetsuhiro Ishikawa, Toyota (JP); Tsuyoshi Yano, Toyota (JP); Kenji Tsuchiya, Toyota (JP); Masanobu Komae, Chita-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 123 days.

(21) Appl. No.: 12/227,846

(22) PCT Filed: Jul. 5, 2007

(86) PCT No.: PCT/JP2007/063875

§ 371 (c)(1),
(2), (4) Date: Dec. 1, 2008

(87) PCT Pub. No.: WO2008/007724

PCT Pub. Date: Jan. 17, 2008

(65) Prior Publication Data

US 2009/0179616 A1 Jul. 16, 2009

(30) Foreign Application Priority Data

Jul. 10, 2006 (JP) ............................. 2006-189572

(51) Int. Cl.
*H02J 7/00* (2006.01)
(52) U.S. Cl. ..................... 320/134; 320/150; 320/153
(58) Field of Classification Search ............ 320/132, 320/134, 150, 153; 307/18, 82
See application file for complete search history.

(56) References Cited

U.S. PATENT DOCUMENTS

| | | | |
|---|---|---|---|
| 6,232,748 B1 * | 5/2001 | Kinoshita | 320/132 |
| 6,501,250 B2 * | 12/2002 | Bito et al. | 320/152 |
| 6,608,396 B2 | 8/2003 | Downer et al. | |
| 7,102,310 B2 * | 9/2006 | Ishishita | 318/268 |
| 7,610,124 B2 * | 10/2009 | Wakashiro et al. | 701/22 |

FOREIGN PATENT DOCUMENTS

| | | |
|---|---|---|
| JP | A-09-019074 | 1/1997 |
| JP | A-09-056011 | 2/1997 |
| JP | A-10-334951 | 12/1998 |
| JP | A-2002-151166 | 5/2002 |

\* cited by examiner

*Primary Examiner*—Edward Tso
*Assistant Examiner*—Ramy Ramadan
(74) *Attorney, Agent, or Firm*—Oliff & Berridge PLC

(57) ABSTRACT

A request determining unit compares a battery temperature of a battery unit with a predetermined temperature management value, and produces a heating request or a cooling request when a temperature deviation of a predetermined threshold is present between them. A current direction determining unit determines, based on thermal reaction characteristics of the battery unit, in which one of a direction on a charge side and a direction on a discharge side a current is to be passed for responding to the heating request or the cooling request. A target current value determining unit determines a target current value related to the charge/discharge determined by the current direction determining unit. A current control unit produces a switching instruction for matching a battery current of the battery unit with the target current value provided from a selecting unit.

23 Claims, 11 Drawing Sheets

FIG.2
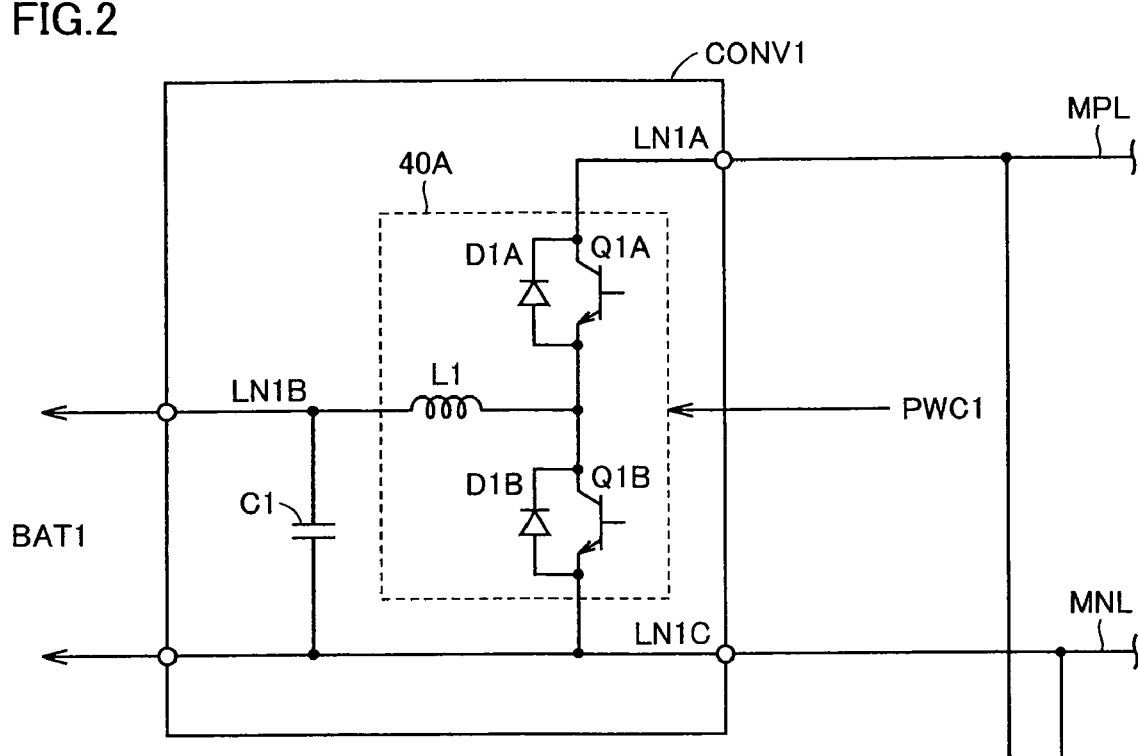
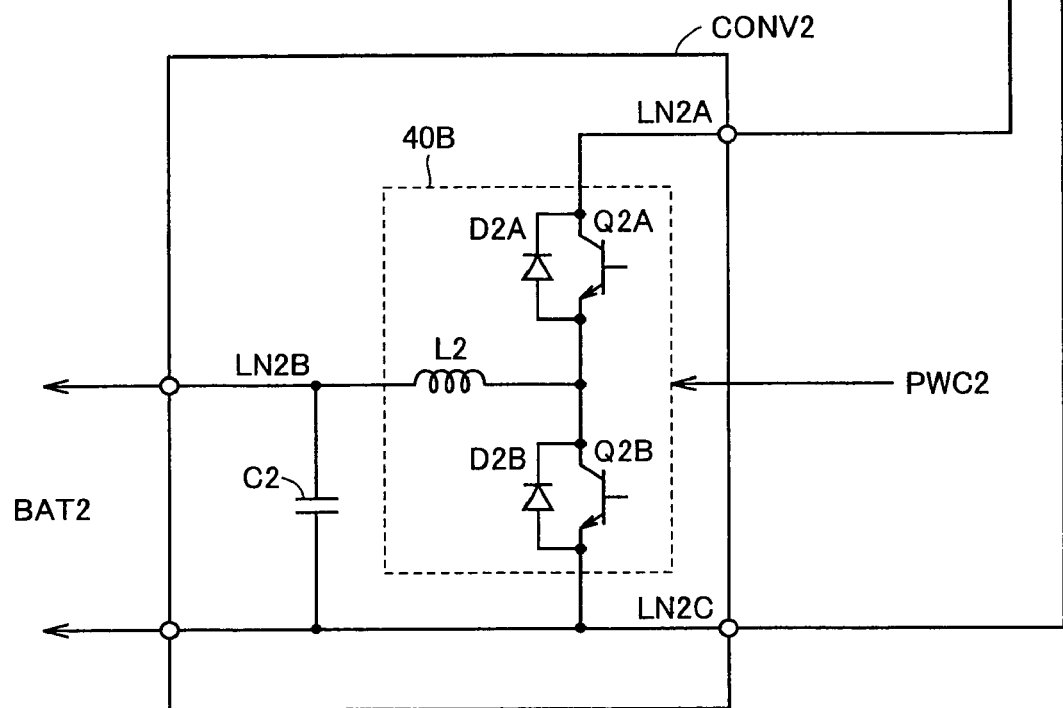

POWER SUPPLY SYSTEM, VEHICLE WITH THE SAME AND TEMPERATURE MANAGING METHOD

TECHNICAL FIELD

The invention relates to a power supply system having a plurality of battery units, a vehicle provided with the same and a temperature managing method, and particularly to a technique that implements temperature management of the battery device including a chemical cell while suppressing an influence on supply/reception of an electric power to/from a load device.

BACKGROUND ART

In recent years, attention has been given to vehicles such as a electric vehicle, a hybrid vehicle, a fuel-cell electric vehicle that use an electric motor as a drive power source in view of environmental issues. This kind of vehicle employs a rechargeable and dischargeable battery unit for supplying an electric power to an electric motor and for converting a kinetic energy into an electric energy for storage during a regenerative operation.

For improving drive performance such as acceleration performance and a continuous travel distance of the vehicle using the electric motor as the drive power source, it is desired to increase a charge/discharge capacity of the battery unit. A structure employing a plurality of battery units has been proposed for increasing the charge/discharge capacity of the battery units.

For example, U.S. Pat. No. 6,608,396 has disclosed an electrical motor power management system providing a desired high DC voltage level to a high voltage vehicle traction system. This electrical motor power management system includes a plurality of power stages each including a battery and a boost-buck DC-DC converter. These power stages are connected in parallel, and provide a DC power to at least one inverter. Also, this system includes a controller controlling the plurality of power stages to charge and discharge uniformly the batteries of the plurality of power stages so that the plurality of power stages keep the battery voltage for at least one inverter.

Meanwhile, a battery unit including a chemical cell stores an electric energy by using an electrochemical energy. Therefore, charge/discharge characteristics thereof are liable to be affected by a temperature. In general, charge/discharge performance of the chemical cell lowers with lowering in temperature, but a higher temperature may promote deterioration of the chemical cell. Therefore, the temperature of the chemical cell mounted on the vehicle is managed to stay within a predetermined temperature range.

A method using an entropy change caused by charging/discharging has been known as one of methods for implementing the temperature management of such chemical cells. More specifically, an entropy changes in the chemical cell in accordance with changes in a state of charge caused by charging/discharging, and the changes in entropy cause a heat generating reaction or a heat absorbing reaction. In particular, a quantity of the reaction heat is relatively large in a lithium ion battery and the like. The reaction (i.e., the heat generating reaction or the heat absorbing reaction) that occurs actually depends on the state of charge and a passed current. Therefore, the temperature of the battery unit can be managed by appropriately determining the battery current according to the state of charge.

For example, Japanese Patent Laying-Open No. 09-019074 has disclosed a charge control system that can keep a battery temperature at an appropriate value during charging. This charge control system includes a charger charging a battery of which chemical reaction caused during charging is a heat absorbing reaction, and also includes control means for controlling a charge current of the charger depending on a state of charge of the battery. The control means causes absorption or generation of heat in the battery based on a state of discharge, a battery temperature and charging conditions, and thereby controls the charge current to keep the battery temperature in the predetermined temperature range.

In the charge control system disclosed in the above Japanese Patent Laying-Open No. 09-019074, the temperature management of the battery unit can be performed only during the charging, as is apparent even from the title. Therefore, sufficient temperature management cannot be performed in a vehicle (e.g., a hybrid vehicle) that frequently switches a state between charging and discharging depending on drive situations. Further, during the execution of the temperature management in the battery unit and thus during the charging, it is impossible to respond sufficiently to a power request made by a load (e.g., motor), resulting in a problem that drive performance of the vehicle is restricted.

DISCLOSURE OF THE INVENTION

The invention has been made for overcoming the above problem, and an object of the invention is to provide a power supply system that can appropriately manage a temperature of a battery unit while suppressing an influence on an electric power supplied and received to/from a load device as well as a vehicle provided with the power supply system and a temperature managing method.

According to an aspect of the invention, the invention provides a power supply system having a plurality of battery units each being rechargeable. The power supply system according to the invention includes a power supply line allowing supply and reception of an electric power between a load device and the power supply system; and a plurality of charge/discharge control units arranged between the plurality of battery units and the power line, respectively, and each being capable of controlling charging/discharging of the corresponding battery unit. The plurality of battery units includes at least one first battery unit handled as a temperature management target, and a residual second battery unit. Each of the first battery unit(s) includes a chemical cell having thermal reaction characteristics that changes a thermal reaction caused by each of charging and discharging between a heat generating reaction and a heat absorbing reaction depending on a state of charge. Further, the power supply system according to the invention includes a temperature obtaining unit obtaining a temperature of the first battery unit; an SOC obtaining unit obtaining a state of charge of the first battery unit; a request producing unit producing one of a heating request and a cooling request for each of the first battery unit(s) based on the temperature obtained by the temperature obtaining unit; a current direction determining unit determining, for the battery unit corresponding to one of the heating request and the cooling request produced by the request producing unit, in which one of a direction on a charge side and a direction on a discharge side a current is to be passed for responding to one of the heating request and the cooling request based on the thermal reaction characteristics, from the state of charge obtained by the SOC obtaining unit; and a control instruction producing unit providing a control instruction to each of the plurality of charge/discharge control units for passing the current in the direction determined by the current direction determining unit.

According to this aspect of the invention, at least one of the first battery unit(s) is handled as the temperature management target. When the heating or cooling request is produced for the first battery unit, the current direction determining unit determines, based on the thermal reaction characteristics, the direction on the charge side or discharge side in which the current to be passed to the battery unit. The second battery unit is not the temperature management target so that the charge/discharge current thereof can be determined relatively flexibly. Therefore, the charge/discharge control of the second battery unit can be performed according to the power request of the load device. Accordingly, it is possible to achieve simultaneously the temperature management for the first battery unit and the responding to the power request made from the load device.

Preferably, the power supply system according to the invention further includes a target current value determining unit determining, based on the temperature of the first battery unit, a target current value for passing the current on one of the charge side and the discharge side determined by the current direction determining unit.

Preferably, the control instruction producing unit provides the control instruction to the charge/discharge control unit corresponding to the first battery unit such that a current value of the first battery unit attains the target current value determined by the target current value determining unit.

Further preferably, the control instruction producing unit provides the control instruction to each of the charge/discharge control unit(s) corresponding to the second battery unit(s) such that the power corresponding to a difference between a sum of the charge/discharge power(s) of the first battery unit(s) and a power required by the load device is supplied.

Preferably, the plurality of battery units consist of one of the first battery unit and one of the second battery unit, and the control instruction producing unit provides the control instruction to the charge/discharge control unit corresponding to the second battery unit such that the power corresponding to a difference between the charge/discharge power of the first battery unit corresponding to the target current value determined by the target current value determining unit and a power required by the load device is supplied.

Preferably, the target current value determining unit determines the target current value with reference to predetermined resistive heat generation characteristics representing a correlation between the current flowing through the first battery unit and a quantity of generated heat.

Preferably, the power supply system further includes a current value restricting unit restricting the target current value determined by the target current value determining unit for the purpose of keeping the output voltage of the first battery unit at or above a predetermined voltage value based on predetermined output voltage characteristics representing a correlation between the current flowing through the first battery unit and an output voltage, when the request producing unit produces the heating request.

Preferably, the first battery unit includes a lithium ion battery.

According to another aspect of the invention, the invention provides a vehicle including one of the foregoing power supply systems and a drive power generating unit receiving an electric power from the power supply system and generating a drive power.

According to another aspect of the invention, the invention provides a temperature managing method for a battery unit in a power supply system having a plurality of battery units each being rechargeable. The power supply system includes a power supply line allowing supply and reception of an electric power between a load device and the power supply system; and a plurality of charge/discharge control units arranged between the plurality of battery units and the power line, respectively, and each being capable of controlling charging/discharging of the corresponding battery unit. The plurality of battery units includes at least one first battery unit handled as a temperature management target, and a residual second battery unit, and each of the first battery unit(s) includes a chemical cell having thermal reaction characteristics changing a thermal reaction caused by each of charging and discharging between a heat generating reaction and a heat absorbing reaction depending on a state of charge. Further, the temperature managing method includes a temperature obtaining step of obtaining a temperature of the first battery unit; an SOC obtaining step of obtaining a state of charge of the first battery unit; a request producing step of producing one of a heating request and a cooling request for each of the first battery unit(s) based on the temperature obtained in the temperature obtaining step; a current direction determining step of determining, for the battery unit corresponding to one of the heating request and the cooling request produced in the request producing step, in which one of a direction on a charge side and a direction on a discharge side a current is to be passed for responding to one of the heating request and the cooling request based on the thermal reaction characteristics, from the state of charge obtained in the SOC obtaining step; and a control instruction producing step of providing a control instruction to each of the plurality of charge/discharge control units for passing the current in the direction determined in the current direction determining step.

Preferably, the temperature managing method according to the invention, further includes a target current value determining step of determining, based on the temperature of the first battery unit, a target current value for passing the current on one of the charge side and the discharge side determined in the current direction determining step.

Further preferably, the control instruction producing step provides the control instruction to the charge/discharge control unit corresponding to the first battery unit such that a current value of the first battery unit attains the target current value determined in the target current value determining step.

Preferably, the control instruction producing step includes providing the control instruction to each of the charge/discharge control unit(s) corresponding to the second battery unit(s) such that the power corresponding to a difference between a sum of the charge/discharge power(s) of the first battery unit(s) and a power required by the load device is supplied.

Preferably, the plurality of battery units consist of one of the first battery unit and one of the second battery unit, and the control instruction producing step includes providing the control instruction to the charge/discharge control unit corresponding to the second battery unit such that the power corresponding to a difference between the charge/discharge power of the first battery unit corresponding to the target current value determined in the target current value determining unit and a power required the load device is supplied.

Preferably, the target current value determining step includes determining the target current value with reference to predetermined resistive heat generation characteristics representing a correlation between the current flowing through the first battery unit and a quantity of generated heat.

Preferably, the temperature managing method further comprises a current value restricting step of restricting the target current value determined in the target current value determining step for the purpose of keeping the output voltage of the first battery unit at or above a predetermined voltage value based on predetermined output voltage characteristics representing a correlation between the current flowing through the first battery unit and an output voltage, when the request producing step produces the heating request.

According to the invention, the temperature of the battery unit can be appropriately managed while suppressing an influence on the power supplied and received to/from the load device.

BRIEF DESCRIPTION OF THE DRAWINGS

FIG. 2 is a schematic view showing a structure of a converter according to the embodiment of the invention.

BEST MODES FOR CARRYING OUT THE INVENTION

Embodiments of the invention will now be described with reference to the drawings. In the following description, the same parts and components bear the same reference numbers, and description thereof is not repeated.

Figure 1:
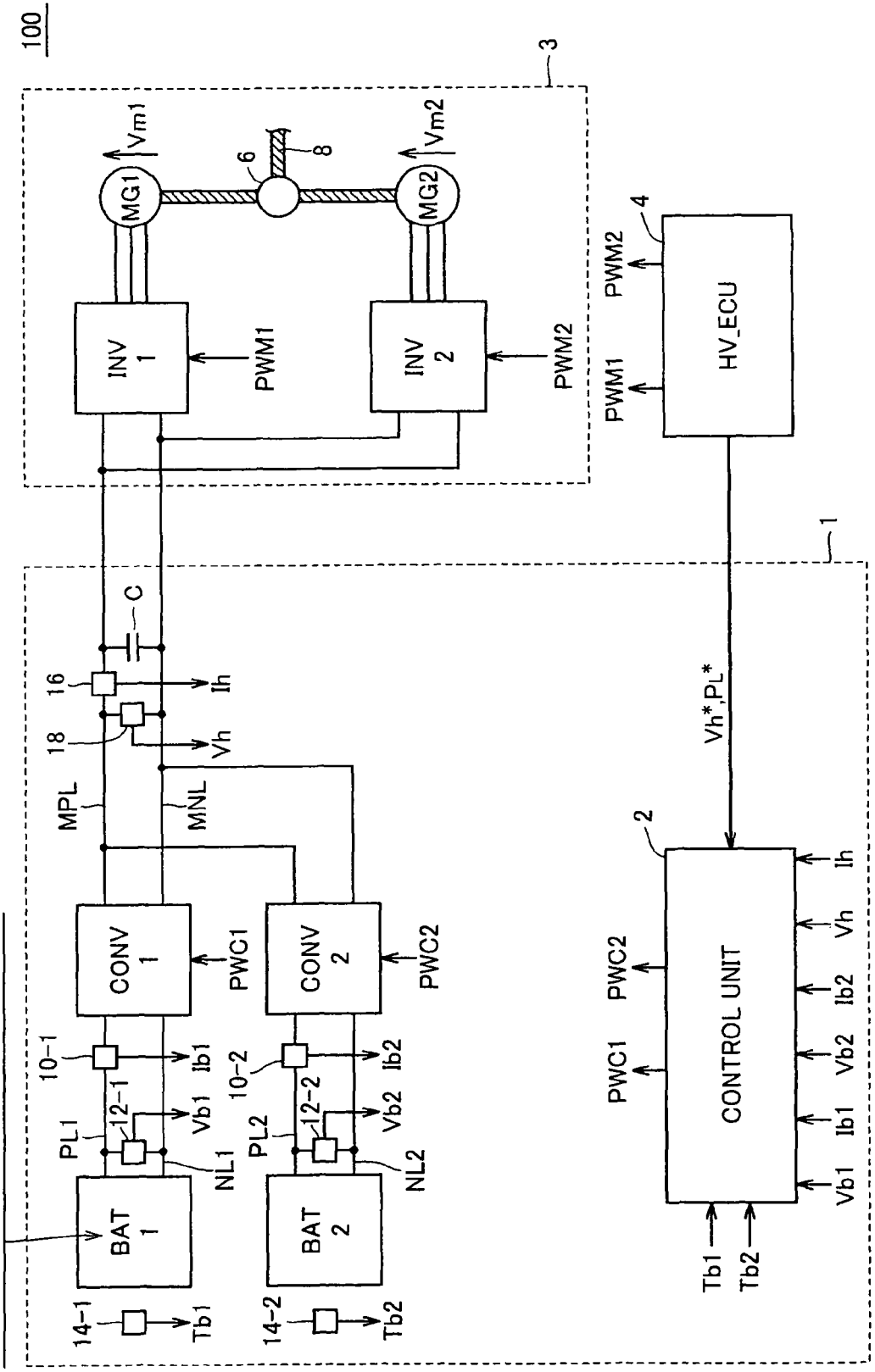
FIG. 1 is a schematic view showing a structure of a substantial part of a vehicle provided with a power supply system according to an embodiment of the invention.

Referring to FIG. 1, description will now be given on a schematic structure of a substantial part of a vehicle 100 provided with an electrical power supply system 1 according to an embodiment of the invention.

In this embodiment, a structure that supplies and receives an electric power to/from a drive power generating unit 3 for generating a drive power of vehicle 100 is described as an example of a load device. Drive power generating unit 3 generates a drive power by receiving the electric power from power supply system 1, and vehicle 100 is driven by transmitting this drive power to wheels (not shown).

In the embodiment described below, power supply system 1 has two battery units which are examples of the plurality of battery units. Power supply system 1 supplies and receives a DC power to/from drive power generating unit 3 via main positive bus line MPL and main negative bus line MNL.

Drive power generating unit 3 includes first and second inverters INV1 and INV2 as well as first and second motor generators MG1 and MG2, and generates the drive power in accordance with switching instructions PWM1 and PWM2 provided from an HV_ECU (Hybrid Vehicle Electrical Control Unit) 4.

Inverters INV1 and INV2 are connected in parallel to main positive bus line MPL and main negative bus line MNL, and operate to supply and receive the power to/from the power supply system 1. More specifically, inverters INV1 and INV2 convert the DC power received via main positive bus line MPL and main negative bus line MNL into AC power, and supply them to motor generators MG1 and MG2, respectively. Further, in a regenerative braking operation or the like of vehicle 100, inverters INV1 and INV2 convert the DC power that are generated by motor generators MG1 and MG2 receiving a kinetic energy of vehicle 100 into the DC power, respectively, and return them as the regenerative electric power to power supply system 1. For example, each of inverters INV1 and INV2 is formed of a bridge circuit including three-phase switching elements, and performs a switching operation (turning on/off the circuit) to generate a three-phase AC power in accordance with switching instruction PWM1 or PWM2 received from HV_ECU 4.

Motor generators MG1 and MG2 can generate the rotational drive power by receiving the AC power supplied from inverters INV1 and INV2, respectively, and can also generate the AC power by receiving externally supplied rotational drive power. For example, each of motor generators MG1 and MG2 is a three-phase AC rotary motor provided with a rotor having an embedded permanent magnet. Motor generators MG1 and MG2 are coupled to a power transmission mechanism 6, and transfer the generated drive power to the wheels (not shown) via a drive shaft 8.

Drive power generating unit 3 may be employed in a hybrid vehicle, in which case motor generators MG1 and MG2 are also coupled mechanically to an engine (not shown) via power transmission mechanism 6 or drive shaft 8. HV_ECU 4 performs the control to attain an optimum ratio between the drive power generated by the engine and the drive power generated by motor generators MG1 and MG2. The hybrid vehicle employing the above structure may also be configured such that one of the motor generators functions exclusively as the electric motor and the other motor generator functions exclusively as the electric power generator.

HV_ECU 4 executes prestored programs to calculate target torques and target rotational speeds of motor generators MG1 and MG2 based on signals provided from various sensors, driving situations, a rate of change in accelerator press-down degree, and prestored maps. HV_ECU 4 issues switching instructions PWM1 and PWM2 to drive power generating unit 3 such that motor generators MG1 and MG2 may generate the target torques and may attain the target rotational speeds thus calculated.

Also, HV_ECU 4 obtains counter electromotive voltages Vm1 and Vm2 occurring in motor generators MG1 and MG2 based on the target torques and the target rotational speeds thus calculated or based on the actual torque values and the actual rotational speed values sensed by the various sensors (not shown), and provides a required voltage value Vh* determined based on these counter electromotive voltages Vm1 and Vm2 to power supply system 1. When drive power generating unit 3 performs a power running operation, HV_ECU 4 sets required voltage value Vh* larger than counter electromotive voltages Vm1 and Vm2 so that power supply system 1 can supply the power to motor generators MG1 and MG2. When drive power generating unit 3 performs the regenerative operation, HV_ECU 4 sets required voltage value Vh* smaller than counter electromotive voltages Vm1 and Vm2 so that the power generated by motor generators MG1 and MG2 may flow reversely to power supply system 1.

Further, HV_ECU 4 calculates a required power value $P_L^*$ based on a product of the foregoing target torque and the target rotational speed or a product of the actual torque value and the actual rotational speed, and provides required power value $P_L^*$ thus calculated to power supply system 1. HV_ECU 4 changes a sign of required power value $P_L^*$ for notifying power supply system 1 of the power request in drive power generating unit 3 such as the power running operation (positive value) and the regenerative operation (negative value).

Further, power supply system 1 includes a smoothing capacitor C, a supplied current detecting unit 16, a supplied voltage detecting unit 18, first and second converters CONV1 and CONV2, first and second battery units BAT1 and BAT2, battery current detecting units 10-1 and 10-2, battery voltage detecting units 12-1 and 12-2, battery temperature detecting units 14-1 and 14-2, and a control unit 2.

Smoothing capacitor C is connected between main positive bus line MPL and main negative bus line MNL for reducing a variation component (AC component) included in the power supplied from converters CONV1 and CONV2.

Supplied current detecting unit 16 is disposed in series with main positive bus line MNL for detecting a current Ih supplied to drive power generating unit 3 and providing a result of the detection to control unit 2.

Supplied voltage detecting unit 18 is connected between main positive bus line MPL and main negative bus line MNL for detecting a voltage Vh supplied to drive power generating unit 3 and providing a result of the detection to control unit 2.

Converters CONV1 and CONV2 can control the charging/discharging of corresponding battery units BAT1 and BAT2, respectively. Thus, converters CONV1 and CONV2 perform voltage converting (boosting or bucking) operations on the voltages between battery unit BAT1 and main positive bus line MPL and between battery unit BAT2 and main negative bus line MNL, and thereby controls the charging/discharging of battery units BAT1 and BAT2, respectively. More specifically, for charging battery units BAT1 and BAT2, converters CONV1 and CONV2 step down the voltage between main positive bus line MPL and main negative bus line MNL, and provide the charge currents to battery units BAT1 and BAT2, respectively. For discharging battery units BAT1 and BAT2, converters CONV1 and CONV2 step up the battery voltages of battery units BAT1 and BAT2, and supply the discharge currents through main positive bus line MPL and main negative bus line MNL, respectively.

Battery units BAT1 and BAT2 can be charged and discharged by converters CONV1 and CONV2, respectively. As will be described later, the power supply system according to the embodiment of the invention handles one of battery units BAT1 and BAT2 as a temperature management target. This temperature management target may be fixed in advance, or may be switched at appropriate time between battery units BAT1 and BAT2 depending on the States Of Charge (SOC) and/or the battery temperatures thereof.

The battery unit that can be handled as the temperature management target includes a chemical cell having thermal reaction characteristics, according to which thermal reactions caused by the charging/discharging change between the heat generating reaction and the heat absorbing reaction depending on the state of charge. For example, the chemical cell is a lithium ion battery. Details of the thermal reaction characteristics of such chemical cell will be described later.

The following description will be given by way of example on the case where battery unit BAT1 is the temperature management target. When battery unit BAT1 is fixedly selected as the temperature management target, battery unit BAT2 may not be the above chemical cell, and may be formed of an accumulator element such as an electrical double layer capacitor.

Each of battery current detecting units 10-1 and 10-2 is disposed in one of the two power lines connecting corresponding battery unit BAT1 or BAT2 to converter CONV1 or CONV2, and detects a battery current Ib1 or Ib2 related to input/output of battery unit BAT1 or BAT2 for providing a result of the detection to control unit 2.

Each of battery voltage detecting units 12-1 and 12-2 is disposed between the two power lines connecting corresponding battery unit BAT1 or BAT2 to converter CONV1 or CONV2, and detects a battery voltage Vb1 or Vb2 of battery unit BAT1 or BAT2 for providing a result of the detection to control unit 2.

Battery temperature detecting units 14-1 and 14-2 are arranged near battery cells forming battery units BAT1 and BAT2, and detect battery temperatures Tb1 and Tb2, i.e., internal temperatures of battery units BAT1 and BAT2 for providing results of the detection to control unit 2, respectively. Battery temperature detecting units 14-1 and 14-2 may be configured to provide central values obtained by averaging processing or the like based on results of detection by a plurality of detection elements that are arranged corresponding to the plurality of battery cells forming battery units BAT1 and BAT2, respectively.

Control unit 2 produces switching instructions PWC1 and PWC2 according to a control structure to be described later based on required voltage value Vh* and required power value $P_L^*$ as well as supplied current Ih, supplied voltage Vh, battery currents Ib1 and Ib2, battery voltages Vb1 and Vb2, and battery temperatures Tb1 and Tb2, and controls the voltage converting operations in converters CONV1 and CONV2, respectively.

In particular, control unit 2 obtains battery temperature Tb1 of battery unit BAT1 that is a temperature management target from battery temperature detecting unit 14-1, and produces a heating or cooling request for battery unit BAT1 based on obtained battery temperature Tb1. When the heating or cooling request is issued for battery unit BAT1, control unit 2 determines, from the obtained state of charge, in which one of the directions on the charge side and the discharge side a current is to be passed for responding to the rising or cooling request based on the thermal reaction characteristics of battery unit BAT1. Further, control unit 2 produces a switching instruction PWC1 for passing the current to/from battery unit BAT1 in the determined direction, and provides it to converter CONV1.

As described above, control unit 2 performs the temperature management on battery unit BAT1 by changing the direction of the current passed to/from battery unit BAT1 depending on battery temperature Tb1.

Also, control unit 2 determines, based on battery temperature Tb1 of battery unit BAT1, a target current value of the current to be passed to/from battery unit BAT1 for performing the temperature management. More specifically, control unit 2 determines the target current value with reference to resistive heat generation characteristics that represent a correlation between battery current Ib1 flowing in battery unit BAT1 and a quantity of resistively generated heat. Thus, control unit 2 determines the target current value such that the resistively generated heat due to the battery current may not excessively increase in quantity.

Further, when the heating request is issued, control unit 2 may restrict the target current value based on output voltage characteristics representing a correlation between battery current Ib1 of battery unit BAT1 and battery voltage Vb1 of battery unit BAT1. Thus, control unit 2 restricts the discharge current passed from battery unit BAT1 to fall within a predetermined range for keeping battery voltage Vb1 of battery unit BAT1 at or above a predetermined voltage value.

Also, control unit 2 produces a switching instruction PWC2 for supplying an electric power corresponding to a difference between the charge/discharge power of battery unit BAT1 and required power value $P_L^*$, and provides it to converter CONV2. More specifically, control unit 2 controls the charging/discharging of converter CONV2 and battery unit BAT2 such that the current passed through power supply system 1 for responding to the heating or cooling request may not affect the external portion (drive power generating unit 3) of power supply system 1.

In the embodiment of the invention, drive power generating unit 3 corresponds to the "load device", main positive bus line MPL and main negative bus line MNL correspond to the "power lines", converters CONV1 and CONV2 correspond to the "plurality of charge/discharge control units", and battery temperature detecting unit 14-1 corresponds to the "temperature obtaining unit".

Referring to FIG. 2, converter CONV1 includes, e.g., a bidirectional chopper circuit, and is formed of a chopper circuit 40A and a smoothing capacitor C1.

Chopper circuit 40A can bidirectional supply the power. More specifically, according to switching instruction PWC1 provided from control unit 2 (FIG. 1), chopper circuit 40A can step up the voltage of the discharge current from battery unit BAT1 for supplying it to drive power generating unit 3 (FIG. 1), and can also step down the voltage of the regenerative power received from drive power generating unit 3 for supplying it as the charging current to battery unit BAT1. Chopper circuit 40A includes positive and negative bus lines LN1A and LN1C, an interconnection LN1B, transistors Q1A and Q1B that are switching elements, diodes D1A and D1B, and an inductor L1.

One of ends of positive bus line LN1A is connected to a collector of transistor Q1A, and the other end is connected to main positive bus line MPL. One ends of negative bus line LN1C is connected to the negative side of battery unit BAT1, and the other end is connected to main negative bus line MNL.

Transistors Q1A and Q1B are connected in series between positive and negative bus lines LN1A and LN1C. A collector of transistor Q1A is connected to positive bus line LN1A, and an emitter of transistor Q1B is connected to negative bus line LN1C. Diode D1A or D1B passing the current from its emitter side to its collector side is connected between the collector and emitter of corresponding transistor Q1A or Q1B. Further, inductor L1 is connected between transistors Q1A and Q1B.

One end of interconnection LN1B is connected to a positive side of battery unit BAT1, and the other end is connected to inductor L1.

Smoothing capacitor C1 is connected between interconnection LN1B and negative bus line LN1C, and reduces AC components included in the DC voltage between interconnection LN1B and negative bus line LN1C.

Structures and operations of converter CONV2 are substantially the same as those of converter CONV1 already described, and therefore description thereof is not repeated.

(Thermal Reaction Characteristics of Chemical Cell)

Since the chemical cell stores an electrical energy, using a chemical reaction, an entropy of internal members changes with progress of charging/discharging. The changes in entropy cause a heat generating reaction or a heat absorbing reaction in the chemical cell. This phenomenon may occur in many types of chemical cells, and particularly it has relatively large effect on the foregoing lithium ion battery.

Figure 3:
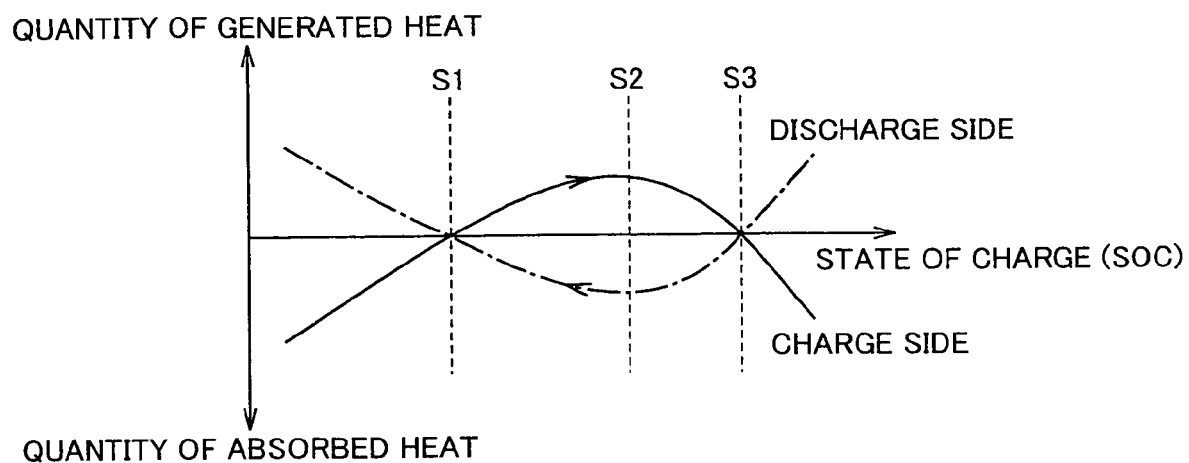
FIG. 3 shows an example of thermal reaction characteristics according to the invention representing a correlation between a State Of Charge (SOC) and a thermal reaction of a chemical cell.

Referring to FIG. 3, in the chemical cell according to the invention, the thermal reaction that occurs due to each of the charging and discharging changes between the heat generating reaction and the heat absorbing reaction depending on the State Of Charge (SOC). In the example shown in FIG. 3, the thermal reaction caused respectively by the charging and discharging change oppositely to each other at state values S1 and S3.

More specifically, when the state of charge is smaller than state value S1, or when the state of charge is larger than state value S3, the heat generating reaction is caused by passing the current on the discharge side, and the heat absorbing reaction is caused by passing the current on the charge side. When the state of charge is between state values S1 and S3, the heat generating reaction is caused by passing the current on the charge side, and the heat absorbing reaction is caused by passing the current on the discharge side.

In the thermal reaction related to the above entropy change, the quantities of the generated heat and absorbed heat depend on the changes in quantity of the state of charge. More specifically, in the thermal reaction characteristics shown in FIG. 3, the quantity of the actually caused heat (generated or absorbed heat) corresponds to the integration value (i.e., area) obtained over the section where the state of charge changes. Therefore, the quantity of generated heat does not correlate with the magnitude of the battery current, and depends on the actually caused difference in state of charge. As described above, it is possible to respond to the heating or cooling request of the battery unit merely by determining the appropriate current direction (charging or discharge side) according to the state of charge of the battery unit, and it is not essential to determine the current value for responding to the above request.

More specifically, it is possible to respond to the heating request by passing the current on the discharge side when the state of charge is smaller than state value S1 or larger than state value S3, and by passing the current on the charge side when the state of charge is larger than state value S1 and smaller than state value S3. Also, it is possible to respond to the cooling request by passing the current on the charge side when state of charge is smaller than state value S1 or larger than state value S3, and by passing the current on the discharge side when state of charge is larger than state value S1 and smaller than state value S3.

Various methods can be employed for measuring the State Of Charge (SOC) of the battery unit. For example, the state of charge can be successively detected by adding a correction state of charge calculated from the integration value of the battery current to a provisional state of charge that is calculated from the battery voltage (open-circuit voltage value) occurring in the open-circuit state of the battery unit.

(Heating and Cooling Operations)

Figure 4:
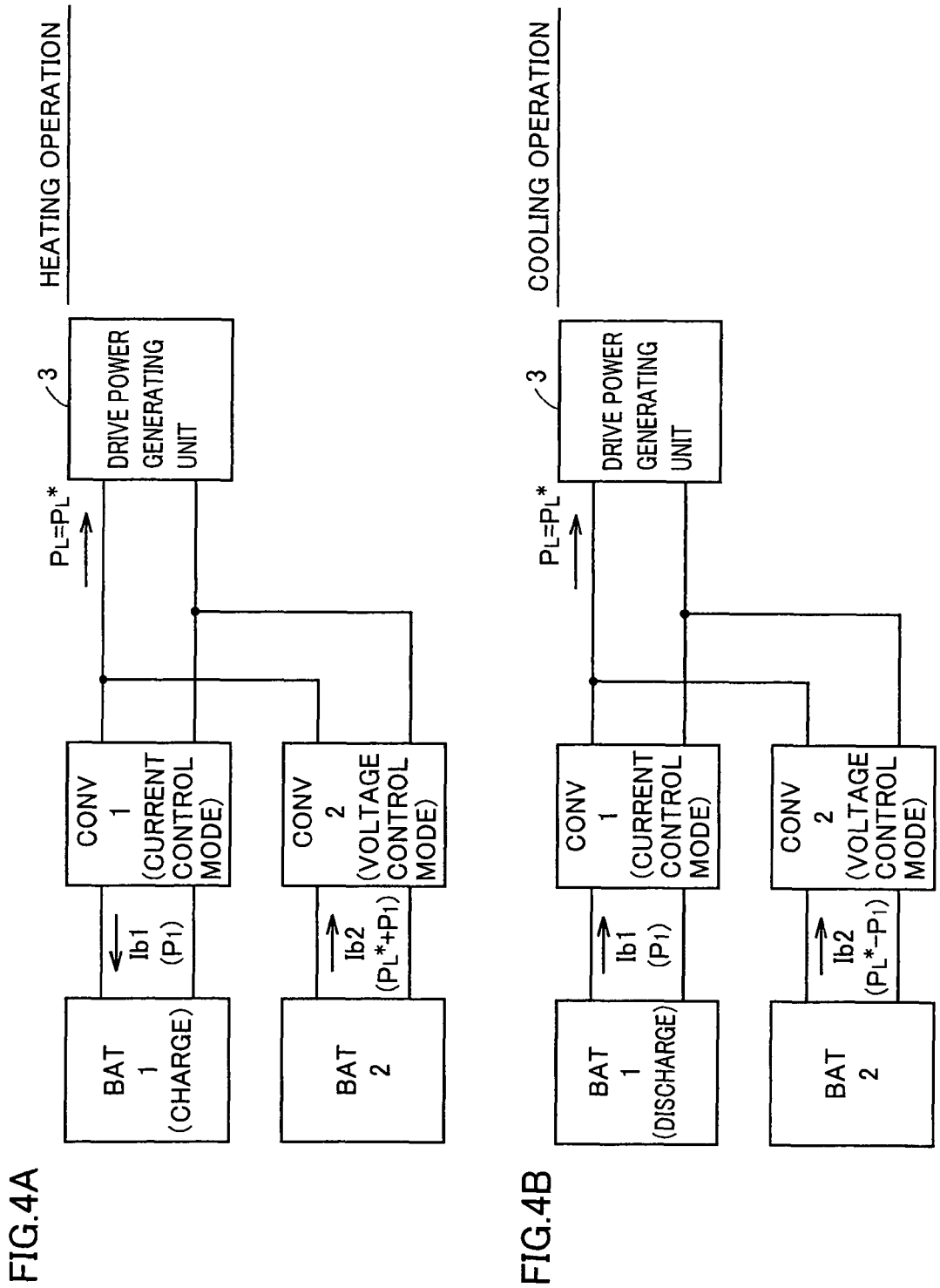
FIGS. 4A and 4B schematically illustrate heating and cooling operations performed on a battery unit having the thermal reaction characteristics shown in FIG. 3, respectively.

Referring to FIGS. 4A and 4B, schematic description will now be given on operations of heating and cooling battery unit BAT1 that has the thermal reaction characteristics shown in FIG. 3. FIGS. 4A and 4B show the case where the state of charge of battery unit BAT1 attains a state value S2 (state value S1<state value S2<state value S3) in FIG. 3.

FIG. 4A shows the case where the heating operation occurs in battery unit BAT1.

FIG. 4B shows the case where the cooling operation occurs in battery unit BAT1.

Referring to FIGS. 3 and 4A, when the state of charge of battery unit BAT1 exhibits state value S2 shown in FIG. 3, the heating operation can be performed by passing the current on the charge side in battery unit BAT1. As shown in FIG. 4A, therefore, converter CONV1 supplies battery current Ib1 toward battery unit BAT1.

Also, as a whole, power supply system 1 is required to supply, to drive power generating unit 3, a power $P_L$ corresponding to required power $P_L^*$ required by drive power generating unit 3. Therefore, converter CONV2 is controlled such that it is supplied with power $P_L$ corresponding to required power $P_L^*$ while providing, for compensation, a power P1 corresponding to battery current Ib1 supplied from converter CONV1 to battery unit BAT1. Thus, battery unit BAT2 discharges battery current Ib2 corresponding to the power obtained by addition (subtraction of a negative value) of power P1 to required power$_L^*$.

Referring to FIGS. 3 and 4B, when the state of charge of battery unit BAT1 exhibits state value S2 shown in FIG. 3, the cooling operation can be performed by passing the current on the discharge side of battery unit BAT1. Accordingly, as shown in FIG. 4B, battery unit BAT1 supplies battery current Ib1 to converter CONV1.

In whole power supply system 1, as described above, power $P_L$ corresponding to required power$_L^*$ required by drive power generating unit 3 must be supplied to drive power generating unit 3. For this, battery unit BAT2 discharges battery current Ib2 corresponding to the power obtained by subtracting power P1 from required power$_L^*$. Naturally, when power P1 discharged from battery unit BAT1 is larger than required power$_L^*$, battery unit BAT2 is charged with the power corresponding to a difference between power P1 and required power $P_L^*$.

The current control operations of converters CONV1 and CONV2 shown in FIGS. 4A and 4B can be implemented by various methods. In this embodiment of the invention, converter CONV1 is controlled in a current control mode, and converter CONV2 is controlled in a voltage control mode as will be described later.

(Determination of Target Current Value)

In the invention, as described above, the temperature management of the battery unit is implemented by using the thermal reaction related to the entropy change in the chemical cell. In the battery unit including the chemical cell, however, resistive heat generation occurs due to the battery current in addition to the thermal reaction related to the entropy change. Therefore, the target current value is determined particularly in the cooling operation such that the resistively generated heat due to the battery current may not increase excessively in quantity.

Figure 5:
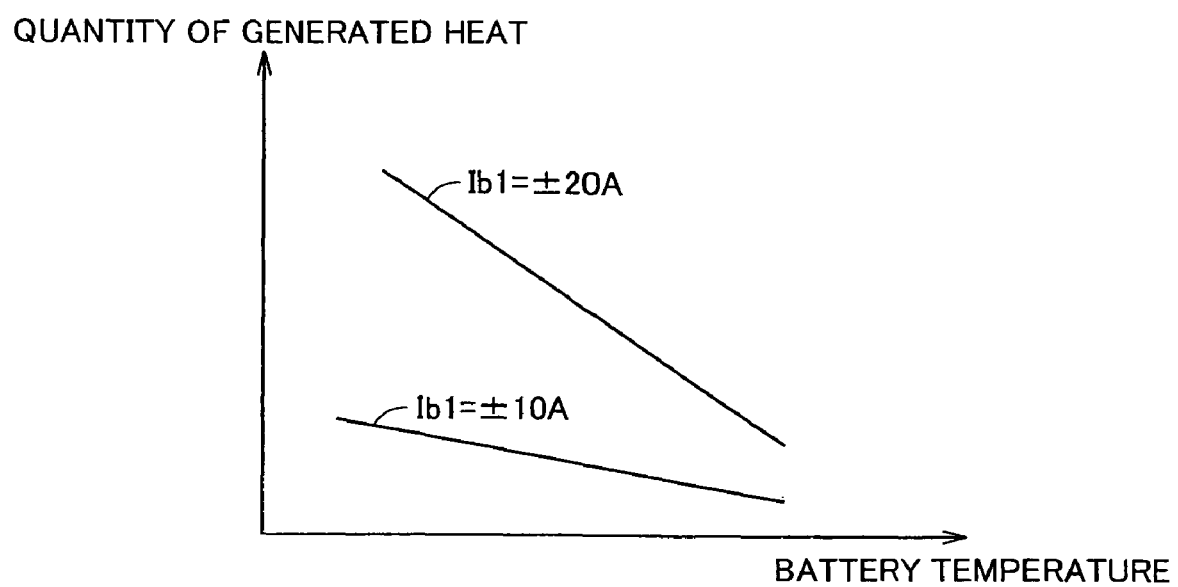
FIG. 5 shows an example of resistive heat generation characteristics representing a correlation between a battery current flowing in the battery unit and a quantity of resistively generated heat.

Referring to FIG. 5, description will now be given on the resistive heat generation characteristics representing the correlation between battery current Ib1 flowing in battery unit BAT1 and the quantity of resistively generated heat.

The resistive heat generation by battery current Ib1 is caused by the internal resistance due to a polarizing operation of battery unit BAT1. The effect of this polarizing operation increases with lowering of the temperature of battery unit BAT1, and therefore the internal resistance increases with lowering of battery temperature Tb1. Therefore, the quantity of resistive heat generation in battery unit BAT1 increases as battery current IB1 increases and as battery temperature Tb1 decreases. The quantity of resistively generated heat depends on an absolute value of battery current Ib1, and therefore does not depend on the direction (charge side or discharge side) of the current flow.

Accordingly, control unit 2 determines, based on battery temperature Tb1 of battery unit BAT1, the target current value of battery current Ib1 passed for the temperature management by referring to the resistive heat generation characteristics that represent the correlation between battery current Ib1 and the quantity of resistively generated heat.

Particularly in the cooling operation or the like, the target current value of battery current Ib1 is restricted such that the quantity of resistively generated heat may not exceed the quantity of heat absorbed by the thermal reaction related to the entropy change.

(Control Structure)

Figure 6:
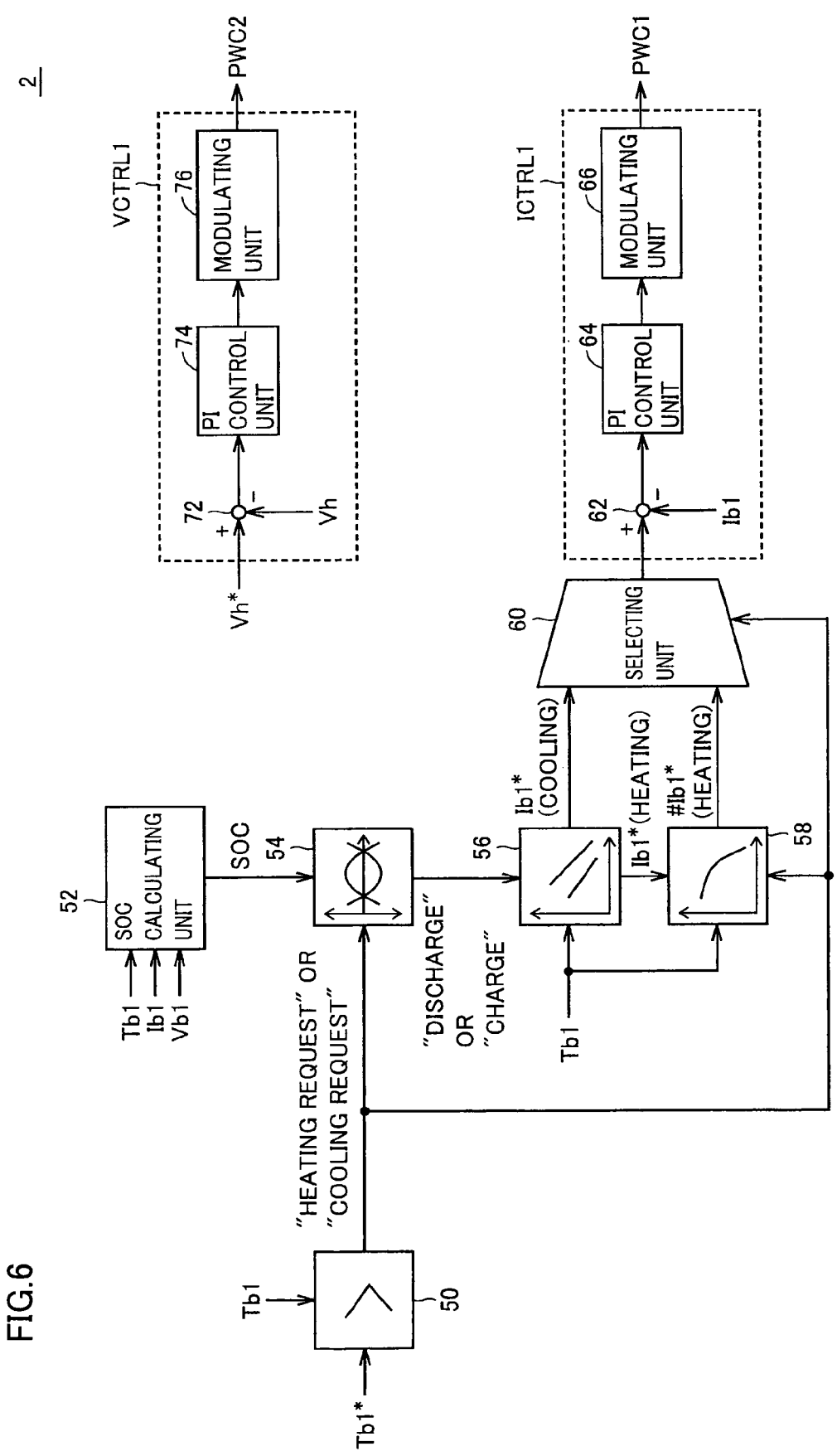
FIG. 6 is a block diagram showing a control structure in a control unit according to the embodiment of the invention.

Referring to FIG. 6, a control structure in control unit 2 according to the embodiment of the invention will be described below.

The control structure according to the embodiment of the invention produces switching instructions PWC1 and PWC2 for instructing the charge/discharge control operations in converters CONV1 and CONV2 so that battery units BAT1 and BAT2 may perform desired charging/discharging, respectively. The control structure according to the embodiment of the invention includes a request producing unit 50, an SOC (State of Charge) calculating unit 52, a current direction determining unit 54, a target current value determining unit 56, a current value restricting unit 58, a selecting unit 60, a current control unit ICTRL1 and a voltage control unit VCTRL1.

Request producing unit 50 determines based on battery temperature Tb1 of battery unit BAT1 whether the heating or cooling request is required for battery unit BAT1 or not, and provides a result of the determination to current direction determining unit 54, current value restricting unit 58 and selecting unit 60. More specifically, request producing unit 50 compares battery temperature Tb1 of battery unit BAT1 with a predetermined temperature management value Tb1*, and produces the heating or cooling request when a deviation larger than a predetermined threshold temperature is present between them.

SOC calculating unit 52 calculates the State Of Charge (SOC) of battery unit BAT1 based on battery temperature Tb1, battery current Ib1 and battery voltage Vb1 that are obtained from battery temperature detecting unit 14-1, battery current detecting unit 10-1 and battery voltage detecting unit 12-1, respectively. For example, SOC calculating unit 52 performs the calculation based on the open-circuit voltage characteristics representing the correlation between an open-circuit voltage value and the state of charge that is obtained experimentally in advance, and thereby calculates the provisional SOC from the open-circuit voltage value derived from battery current Ib1 and battery voltage Vb1. SOC calculating unit 52 calculates the correction SOC from the integration value of battery current Ib1. SOC calculating unit 52 successively calculates the SOC (State Of Charge) by adding the provisional SOC to the correction SOC.

Current direction determining unit 54 performs the determination, based on the thermal reaction characteristics representing the correlation between the state of charge of battery unit BAT1 and the thermal reaction, in which one of the direction on the charge side and the direction of the discharge side the current is to be passed for responding to the heating request or cooling request made by request producing unit 50. More specifically, current direction determining unit 54 obtains the state of charge of battery unit BAT1 from SOC calculating unit 52, and determines, based on the thermal reaction characteristics obtained experimentally in advance, the direction (charge or discharge) of the current that corresponds to each of the heat absorbing reaction and heat generating reaction in the obtained state of charge. Current direction determining unit 54 provides a result of this determination to target current value determining unit 56.

Target current value determining unit 56 determines, based on battery temperature Tb1 of battery unit BAT1, a target current value Ib1* related to charge/discharge determined by current direction determining unit 54. More specifically, target current value determining unit 56 determines target current value Ib1* based on the relation between the quantity of absorbed/generated heat related to the entropy change and the quantity of resistively generated heat. More specifically, target current value determining unit 56 refers to the resistive heat generation characteristics that are determined in advance and represent the correlation between battery current Ib1 passed in battery unit BAT1 and the quantity of generated heat, and thereby determines target current value Ib1* in the heating operation so that a predetermined quantity of heat may be resistively generated. Also, it determines target current value Ib1* in the cooling operation so that the resistively generated heat may not exceed in quantity the heat absorbed by the thermal reaction related to the entropy change. For determining the direction on the charge side or the discharge side in which the current is to be passed for battery unit BAT1, target current value determining unit 56 provides target current value Ib1*, typically by setting a negative value on the charge side and setting a positive value on the discharge side. Target current value determining unit 56 provides target current value Ib1* for the cooling operation to selecting unit 60, and provides target current value Ib1* for the heating operation to current value restricting unit 58.

When it is determined that request producing unit 50 has issued the heating request, current value restricting unit 58 restricts target current value Ib1* determined by target current value determining unit 56, based on the predetermined output voltage characteristics that represent the correlation between the discharge current of battery unit BAT1 and battery voltage Vb1 of battery unit BAT1. Thus, in the heating operation, target current value determining unit 56 determines target current value Ib1* to pass as large a current as possible, but an excessively large discharge current of battery unit BAT1 may excessively lower the output voltage due to the voltage lowering caused by the internal resistance. In view of this, current value restricting unit 58 restricts target current value Ib1* in the heating operation so that the output voltage of battery unit BAT1 may keep a predetermined lower limit or higher.

In general, the internal resistance of the battery unit depends on the battery temperature. Therefore, current value restricting unit 58 selects the output voltage characteristics corresponding to battery temperature Tb1 of battery unit BAT1 from among the plurality of output voltage characteristics that are experimentally obtained in advance for various battery temperatures, respectively, and restricts target current value Ib1* in the heating operation not to exceed the predetermined upper limit value, based on the selected output voltage characteristic. Current value restricting unit 58 provides a target current value #Ib1* thus restricted to selecting unit 60.

Depending on a result of the determination received from request producing unit 50, selecting unit 60 provides either target current value Ib1* for the cooling operation received from target current value determining unit 56 or target current value #Ib1* for the heating operation received from current value restricting unit 58 to current control unit ICTRL1.

Current control unit ICTRL1 produces switching instruction PWC1 so that battery current Ib1 of battery unit BAT1 may attain the target current value provided from selecting unit 60. More specifically, current control unit ICTRL1 includes a subtracting unit 62, a PI control unit 64 and a modulating unit 66. Subtracting unit 62 and PI control unit 64 form a current feedback control element.

Subtracting unit 62 calculates a deviation between the target current value provided from selecting unit 60 and battery current Ib1 of battery unit BAT1, and provides the calculated deviation to PI control unit 64.

PI control unit 64 includes at least a proportional element (P element) and an integral element (I element), and provides a control output corresponding to the deviation provided from subtracting unit 62 in accordance with a predetermined gain and a predetermined time constant.

Modulating unit 66 compares a carrier wave generated by an oscillating unit (not shown) with the control output of PI control unit 64, and produces switching instruction PWC1. The control output provided from PI control unit 64 corresponds to a duty ratio with respect to transistor Q1A or Q1B (FIG. 2) of converter CONV1.

By the control structure described above, converter CONV1 operates in the current control mode (FIGS. 4A and 4B).

Voltage control unit VCTRL1 provides switching instruction PWC2 to converter CONV2 corresponding to battery unit BAT2 for supplying a power corresponding to the difference between the charge/discharge power of battery unit BAT1 and required power value $P_L^*$ of drive power generating unit 3. Thus, voltage control unit VCTRL1 produces switching instruction PWC2 so that voltage Vh supplied to drive power generating unit 3 may attain required voltage value Vh*. Supplied voltage Vh depends on a power supply/reception balance between power supply system 1 and drive power generating unit 3. More specifically, when the supplied power is small as compared with the power required in drive power generating unit 3, supplied voltage Vh lowers. When the supplied power is large as compared with the power required in drive power generating unit 3, supplied voltage Vh rises. Therefore, the control for matching supplied voltage Vh with required voltage value Vh* indirectly means the supply of the power corresponding to the difference between the charge/discharge power of battery unit BAT1 and required power value $P_L^*$ of drive power generating unit 3.

More specifically, voltage control unit VCTRL1 includes a subtracting unit 72, a PI control unit 74 and a modulating unit 76. Subtracting unit 72 and PI control unit 74 form a voltage feedback control element.

Subtracting unit 72 calculates a deviation between required voltage value Vh* of drive power generating unit 3 and supplied voltage Vh, and provides the calculated deviation to PI control unit 74.

PI control unit 74 includes at least a proportional element and an integral element, and provides a control output corresponding to the deviation provided from subtracting unit 72 in accordance with a predetermined gain and a time constant.

Modulating unit 76 compares a carrier wave generated by an oscillating unit (not shown) with the control output of PI control unit 74, and produces switching instruction PWC2. The control output provided from PI control unit 74 corresponds to a duty ratio with respect to a transistor Q2A or Q2B (FIG. 2) of converter CONV2.

By the control structure described above, converter CONV2 operates in the voltage control mode (FIGS. 4A and 4B).

In the embodiment of the invention, SOC (State Of Charge) calculating unit 52 corresponds to the "SOC obtaining unit", request producing unit 50 corresponds to the "request producing unit", current direction determining unit 54 corresponds to the "current direction determining unit", current control unit ICTRL1 corresponds to the "control instruction producing unit", target current value determining unit 56 corresponds to the "target current value determining unit" and current value control unit 58 corresponds to the "current value restricting unit".

Figure 7:
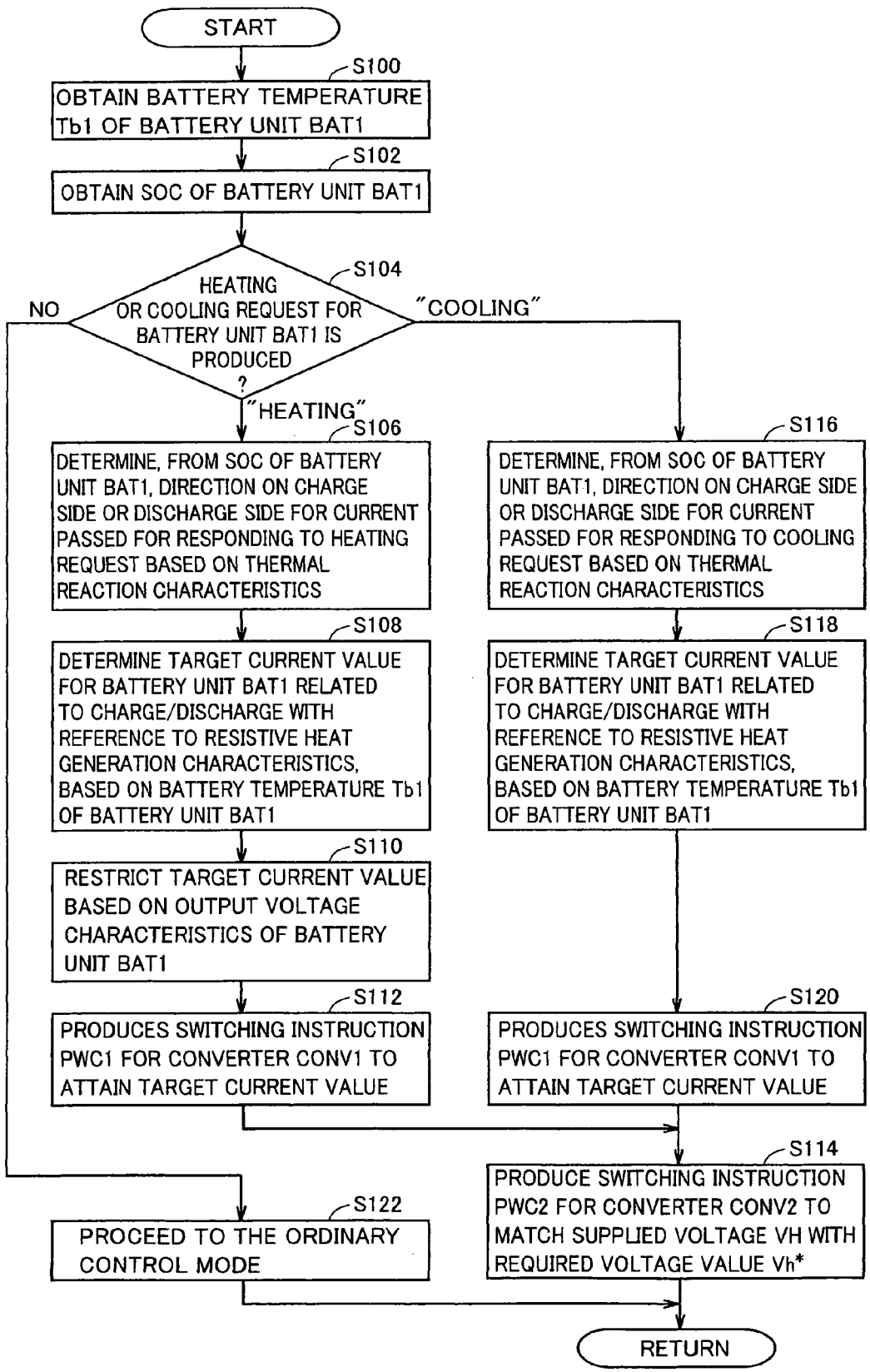
FIG. 7 is a flowchart illustrating a processing procedure in the control unit according to the embodiment of the invention.

Referring to FIG. 7, description will now be given on a processing procedure of control unit 2 according to the embodiment of the invention.

Control unit 2 obtains battery temperature Tb1 of battery unit BAT1 (step S100). Control unit 2 obtains the state of charge of battery unit BAT1 (step S102). Based on battery temperature Tb1 obtained in step S100, control unit 2 determines whether a heating request or a cooling request is to be produced for battery unit BAT1 or not (step S104).

When the heating request is produced (in the case of "heating" in step S104), control unit 2 determines, from the state of charge of battery unit BAT1 obtained in step S102, in which one of the direction on the charge side and the direction on the discharge side the current is to be passed for responding to the heating request based on the thermal reaction characteristics of battery unit BAT1 (step S106). Based on battery temperature Tb1 of battery unit BAT1 obtained in step S100, control unit 2 refers to the resistive heat generation characteristics of battery unit BAT1, and determines the target current value for battery unit BAT1 related to the charge/discharge (step S108). Further, based on the output voltage characteristics of battery unit BAT1, control unit 2 restricts the target current value determined in step S108 (step S110).

Control unit 2 produces switching instruction PWC1 for converter CONV1 so that battery current Ib1 of battery unit BAT1 may flow in the direction determined in step S106 and may attain the target current value determined in step S108 or S110 (step S112).

Further, control unit 2 produces switching instruction PWC2 for converter CONV2 so that supplied voltage Vh may attain required voltage value Vh* (step S114). Then, control unit 2 returns to the initial processing.

When the cooling request is produced (in the case of "cooling" in step S104), control unit 2 determines, from the state of charge of battery unit BAT1 obtained in step S102, in which one of the direction on the charge side and the direction on the discharge side the current is to be passed for responding to the cooling request based on the thermal reaction characteristics of battery unit BAT1 (step S116). Based on battery temperature Tb1 of battery unit BAT1 obtained in step S100, control unit 2 refers to the resistive heat generation characteristics of battery unit BAT1, and determines the target current value for battery unit BAT1 related to the charge/discharge (step S118).

Control unit 2 produces switching instruction PWC1 for converter CONV1 so that that battery current Ib1 of battery unit BAT1 flows in the direction determined in step S116 and may attain the target current value determined in step S118 (step S120).

Further, control unit 2 produces switching instruction PWC2 for converter CONV2 such that supplied voltage Vh may attain required voltage value Vh* (step S114). Then, control unit 2 returns to the initial processing.

When neither heating request nor cooling request is produced (NO in step S1104), control unit 2 proceeds to the ordinary control mode (step S122), and returns to the initial processing.

The above "ordinary control mode" is not restricted to a specific control mode, but it is preferable to employ, e.g., such a configuration that both converters CONV1 and CONV2 are controlled in the voltage control mode, or that both converters CONV1 and CONV2 are controlled in the current control mode.

According to the embodiment of the invention, one (BAT1) of two battery units BAT1 and BAT2 is handled as the temperature management target. When it is determined that the heating or cooling request has been issued for battery unit BAT1, it is determined, based on the thermal reaction characteristics, in which one of the direction on the charge side and the direction on the discharge side the current is to be passed to/from battery unit BAT1. Battery unit BAT2 is not a temperature management target so that the charge/discharge current thereof can be determined relatively flexibly. For battery unit BAT2, therefore, the charge/discharge control can be performed corresponding to the power request of the load device. Accordingly, it is possible to implement simultaneously the temperature control for battery unit BAT1 and the response to the power request issued from the load device, and the temperature control of the battery unit can be appropriately implemented while suppressing the influence on the power supplied and received to/from the load device.

Further, the embodiment of the invention determines the target current value related to the charge/discharge based on the resistive heat generation characteristics that represent the correlation between the battery current flowing in the battery unit and the generated heat quantity thereof. Therefore, when the cooling is required, the battery current is determined so that the quantity of resistively generated heat may not exceeds the quantity of heat absorbed by the thermal reaction related to the entropy change. When the heating is required, the target current value is restricted to keep the output voltage of the battery unit at a predetermined lower limit or higher. Thereby, the optimum target current values can be determined when the cooling and the heating are required, so that the temperature management of the battery unit can be implemented more efficiently.

(First Modification)

Power supply system 1 according to the embodiment of the invention already described can implement both the control of battery current Ib1 of converter CONV1 that is the temperature management target and the control of the power supplied to drive power generating unit 3. Since the electric power supplied to drive power generating unit 3 corresponds to the sum of the power provided from converters CONV1 and CONV2, the power supplied to drive power generating unit 3 and the power provided from converter CONV2 can be controlled to control indirectly battery current Ib1, i.e., the power passing through converter CONV1 that corresponds the temperature management target.

Accordingly, a first modification of the embodiment of the invention will now be discussed in connection with a configuration which controls battery current Ib2 of converter CONV2 that is not the temperature management target, and thereby indirectly controls battery current Ib1 of converter CONV1 that is the temperature management target.

The power supply system according to the first modification of the embodiment of the invention is substantially the same as power supply system 1 shown in FIG. 1 except for the control structure in the control unit, and therefore detailed description thereof is not repeated.

Figure 8A:
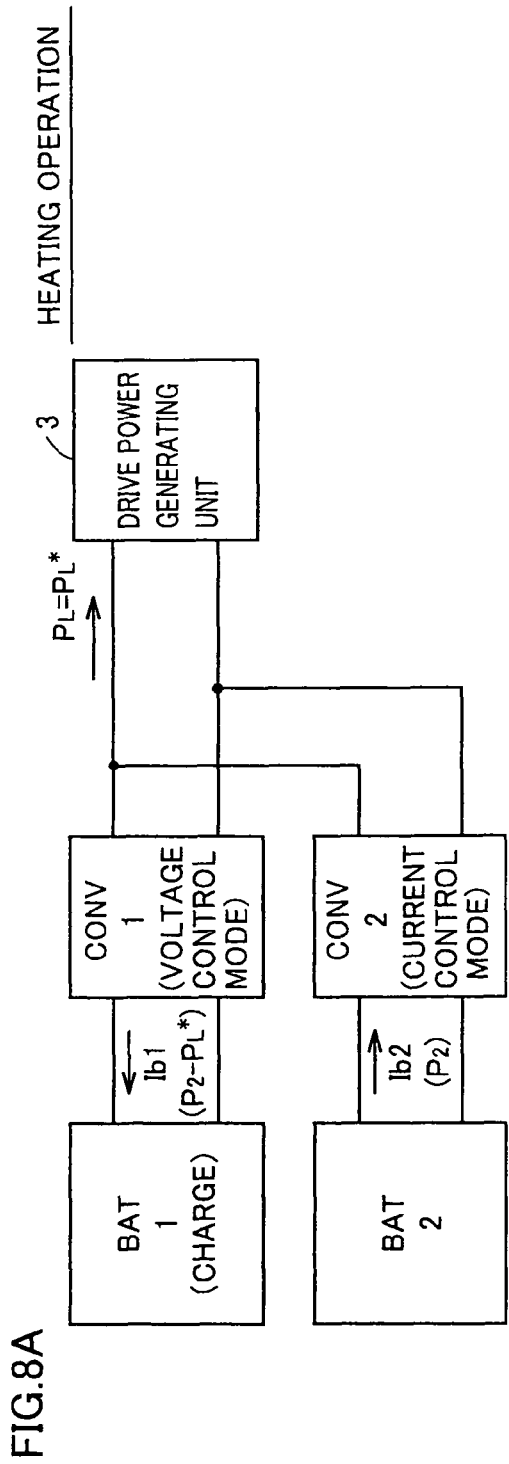
FIGS. 8A and 8B schematically illustrate heating and cooling operations similar to those of FIGS. 4A and 4B in a first modification of the embodiment of the invention.
Figure 8B:
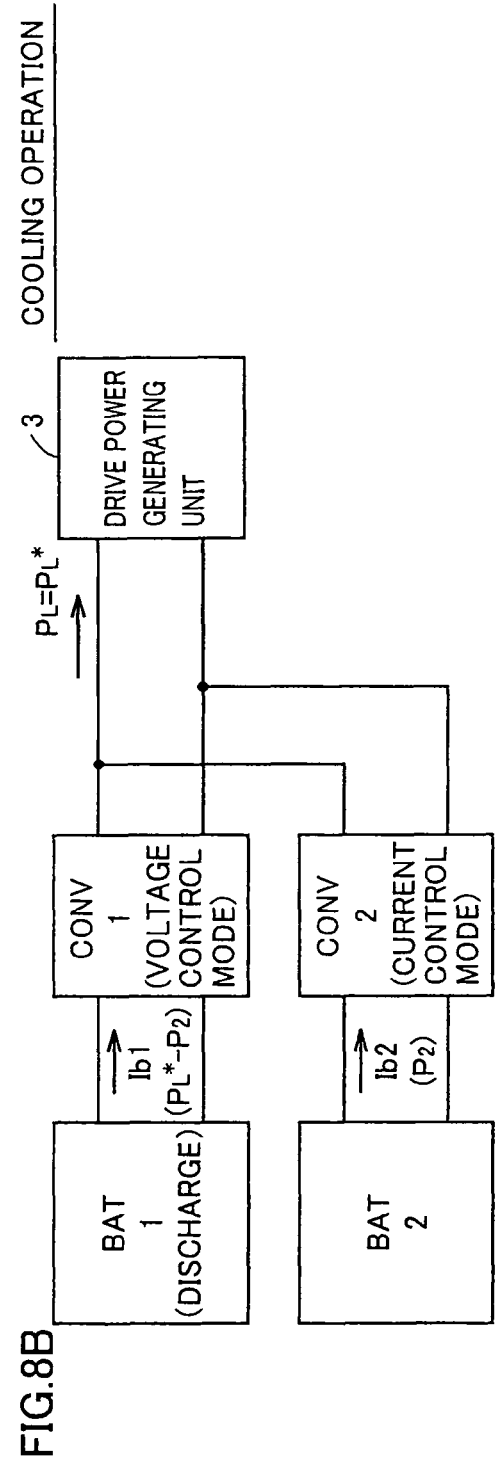

Referring to FIGS. 8A and 8B, description will now be given on a schematic configuration employed in the first modification of the embodiment of the invention for implementing the heating operation and the cooling operation similarly to those in FIGS. 4A and 4B.

FIG. 8A shows an operation for heating battery unit BAT1.

FIG. 8B shows an operation for cooling battery unit BAT1.

Referring to FIG. 8A, when battery unit BAT2 discharges a power P2 larger than required power value $P_L{}^*$, power $P_L$ corresponding to required power value $P_L{}^*$ is supplied to drive power generating unit 3, and a residual power(=(power P2)−(required power value $P_L{}^*$)) is supplied to battery unit BAT1. Thereby, battery unit BAT1 is charged with this residual power.

Referring to FIG. 8B, when battery unit BAT2 discharges power P2 smaller than required power value $P_L{}^*$, power $P_L$ corresponding to required power value $P_L{}^*$ is supplied to drive power generating unit 3, and battery unit BAT1 bears an insufficient power(=(required power value $P_L{}^*$)−(power P2)). Thereby, battery unit BAT1 discharges this insufficient power.

As described above, converter CONV2 is controlled to supply the power corresponding to the difference between the charge/discharge power corresponding to the target current value of battery unit BAT1 and required power value $P_L{}^*$ of drive power generating unit 3, and thereby battery current Ib1 of battery unit BAT1 can be indirectly controlled. In the first modification of the embodiment of the invention, therefore, the temperature management of battery unit BAT1 is implemented by controlling converter CONV2 in the current control mode and controlling converter CONV1 in the voltage control mode.

(Control Structure)

Figure 9:
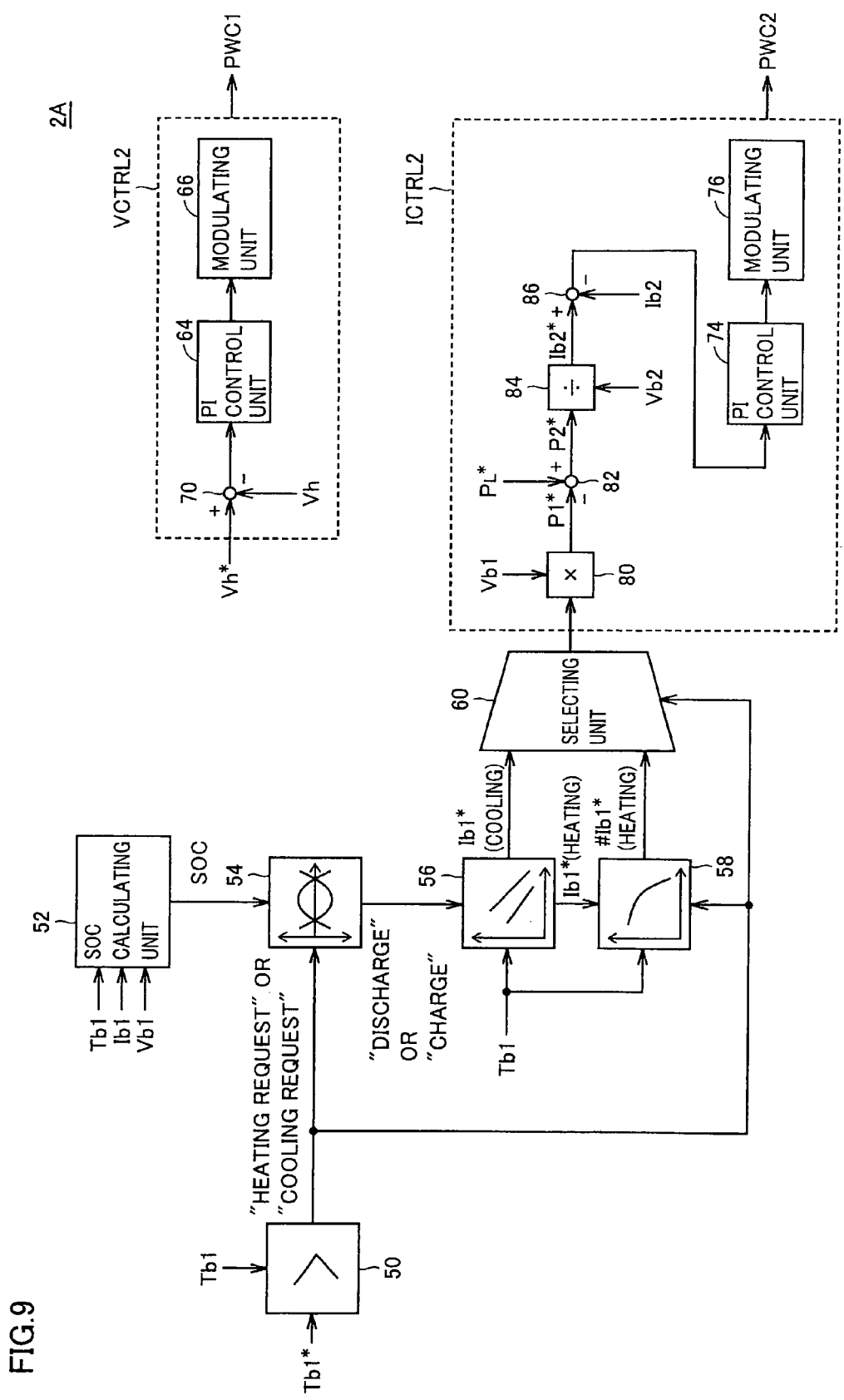
FIG. 9 is a block diagram showing a control structure in a control unit according to the first modification of the embodiment of the invention.

Referring to FIG. 9, description will now be given on the control structure in a control unit 2A according to the first modification of the embodiment of the invention.

The control structure according to the first modification of the embodiment of the invention differs from the control structure according to the embodiment of the invention shown in FIG. 6 in that current control unit ICTRL1 and voltage control unit VCTRL1 are replaced with a current control unit ICTRL2 and a voltage control unit VCTRL2, respectively.

Current control unit ICTRL2 produces switching instruction PWC2 for controlling converter CONV2 so that battery current Ib1 of battery unit BAT1 may attain the target current value provided from selecting unit 60.

More specifically, current control unit ICTRL2 includes a multiplying unit 80, subtracting units 82 and 86, a dividing unit 84, PI control unit 74 and modulating unit 76. Subtracting unit 86 and PI control unit 74 form a current feedback control element.

Multiplying unit 80 multiplies the target current value provided from selecting unit 60 by battery voltage Vb1 of battery unit BAT1 to calculate a target power P1* of battery unit BAT1, and provides it to subtracting unit 82.

Subtracting unit 82 calculates a target power P2* of battery unit BAT2 from a deviation between required power value $P_L{}^*$ of drive power generating unit 3 and target power P1* of battery unit BAT1, and provides it to dividing unit 84. Target power P2* provided from subtracting unit 82 becomes negative on the charge side, and becomes positive on the discharge side.

Dividing unit 84 calculates a target current value Ib2* of battery unit BAT2 by dividing target power P2* of battery unit BAT2 received from subtracting unit 82 by battery voltage Vb2 of battery unit BAT2, and provides it to subtracting unit 86.

Subtracting unit 86 calculates a deviation between target current value Ib2* provided from dividing unit 84 and battery current Ib2 of battery unit BAT2, and provides the calculated deviation to PI control unit 74.

PI control unit 74 includes at least the proportional element and the integral element, and provides the control output corresponding to the deviation provided from subtracting unit 86 according to the predetermined gain and the time constant.

Modulating unit 76 compares the carrier wave generated by the oscillating unit (not shown) with the control output of PI control unit 74, and produces switching instruction PWC2.

By the control structure described above, converter CONV2 operates in the current control mode (FIGS. 8A and 8B).

Voltage control unit VCTRL2 produces switching instruction PWC1 so that voltage Vh supplied to drive power generating unit 3 may attain required voltage value Vh*. More specifically, voltage control unit VCTRL2 includes a subtracting unit 70, PI control unit 64 and modulating unit 66. Subtracting unit 70 and PI control unit 64 form a voltage feedback control element.

Subtracting unit 70 calculates a deviation between required voltage value Vh* of drive power generating unit 3 and supplied voltage Vh, and provides the calculated deviation to PI control unit 64. PI control unit 64 provides the control output corresponding to the deviation provided from subtracting unit 70 according to a predetermined gain and a time constant. Modulating unit 66 compares the carrier wave generated by the oscillating unit (not shown) with the control output of PI control unit 64, and produces switching instruction PWC1.

Converter CONV1 having the control structure described above operates in the voltage control mode (FIGS. 8A and 8B).

Other structures are substantially the same as those of the control structure according to the embodiment of the invention shown in FIG. 6, and therefore description thereof is not repeated.

Figure 10:
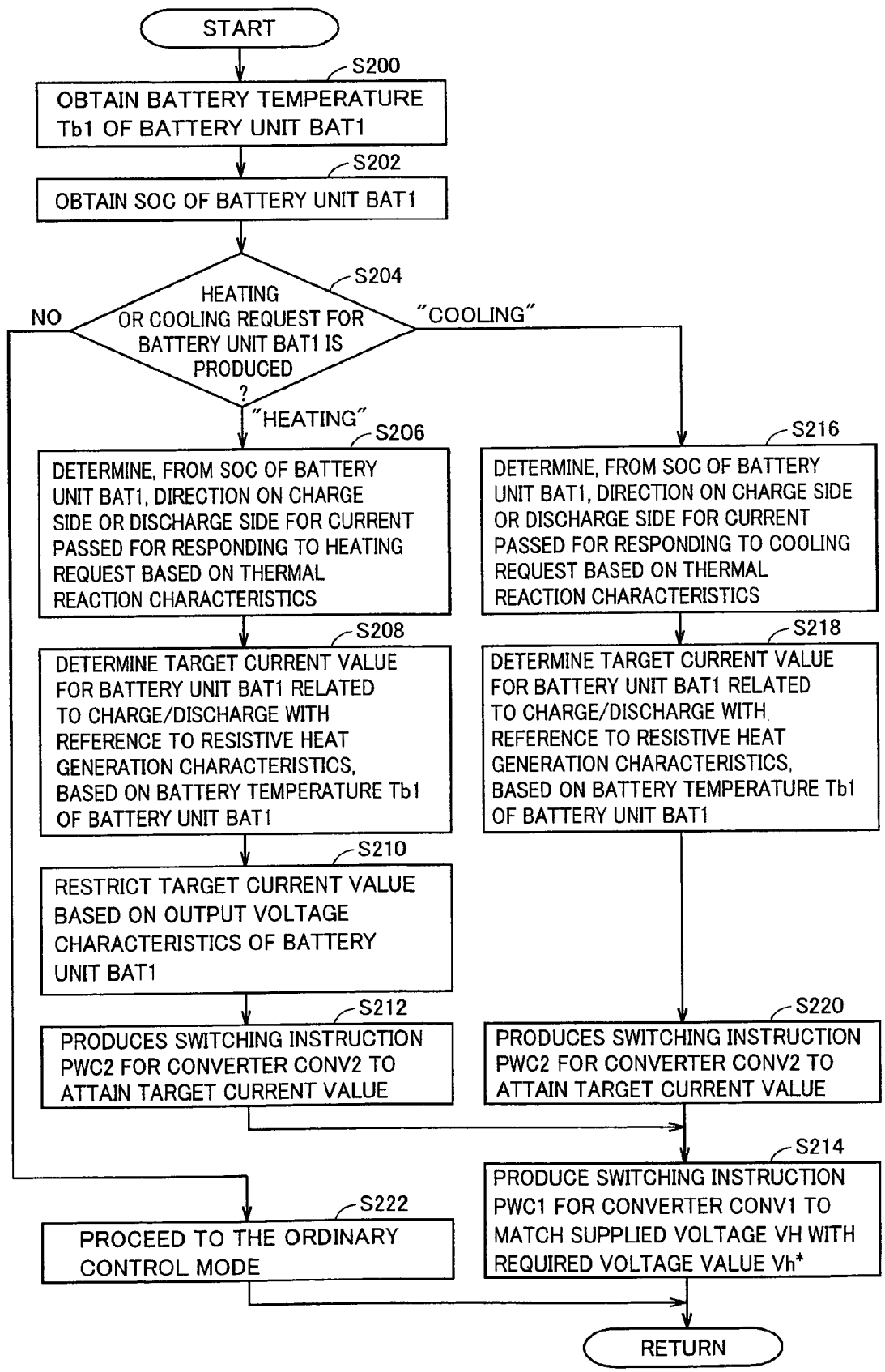
FIG. 10 is a flowchart showing a processing procedure in the control unit according to the first modification of the embodiment of the invention.

Referring to FIG. 10, description will now be given on a processing procedure of control unit 2A according to the first modification of the embodiment of the invention.

Control unit 2A obtains battery temperature Tb1 of battery unit BAT1 (step S200). Control unit 2A obtains the state of charge of battery unit BAT1 (step S202). Based on battery temperature Tb1 obtained in step S200, control unit 2A determines whether a heating request or a cooling request is to be produced for battery unit BAT1 or not (step S204).

When the heating request is produced (in the case of "heating" in step S204), control unit 2A determines, from the state of charge of battery unit BAT1 obtained in step S202, in which one of the direction on the charge side and the direction on the discharge side the current is to be passed for responding to the heating request based on the thermal reaction characteristics of battery unit BAT1 (step S206). Based on battery temperature Tb1 of battery unit BAT1 obtained in step S200, control unit 2A refers to the resistive heat generation characteristics of battery unit BAT1, and determines the target current value for battery unit BAT1 related to the charge/discharge (step S208). Further, based on the output voltage characteristics of battery unit BAT1, control unit 2A restricts the target current value determined in step S208 (step S210).

Control unit 2A produces switching instruction PWC2 for converter CONV2 so that battery current Ib1 of battery unit BAT1 may flow in the direction determined in step S206 and may attain the target current value determined in step S208 or S210 (step S212).

Further, control unit 2A produces switching instruction PWC1 for converter CONV1 so that supplied voltage Vh may attain required voltage value Vh* (step S214). Then, control unit 2A returns to the initial processing.

When the cooling request is produced (in the case of "cooling" in step S204), control unit 2A determines, from the state of charge of battery unit BAT1 obtained in step S202, in which one of the direction on the charge side and the direction on the discharge side the current is to be passed for responding to the cooling request based on the thermal reaction characteristics of battery unit BAT1 (step S216). Based on battery temperature Tb1 of battery unit BAT1 obtained in step S200, control unit 2A refers to the resistive heat generation characteristics of battery unit BAT1, and determines the target current value for battery unit BAT1 related to the charge/discharge (step S218).

Control unit 2A produces switching instruction PWC2 for converter CONV2 so that battery current Ib1 of battery unit BAT1 may flow in the direction determined in step S216 and may attain the target current value determined in step S218 (step S220).

Further, control unit 2A produces switching instruction PWC1 for converter CONV1 so that supplied voltage Vh may attain required voltage value Vh* (step S214). Then, control unit 2A returns to the initial processing.

When neither heating request nor cooling request is produced (NO in step S204), control unit 2A proceeds to the ordinary control mode (step S222), and returns to the initial processing.

The above "ordinary control mode" is not restricted to a specific control mode, but it is preferable to employ, e.g., such a configuration that both converters CONV1 and CONV2 are controlled in the voltage control mode, or that both converters CONV1 and CONV2 are controlled in the current control mode.

The first modification of the embodiment of the invention can achieve substantially the same effect as the first embodiment of the invention already described. Further, the first modification of the embodiment of the invention produces the switching instruction for converter CONV2 that cooperates to perform the power supply with converter CONV1 corresponding to battery unit BAT1 of the temperature management target, and particularly produces the switching instruction corresponding to the power request made by the load device. Therefore, it is possible to respond more reliably to the power request from the load device, as compared with the embodiment of the invention.

(Second Modification)

In addition to the power supply system having the two battery units as described before, the invention may be applied to a power supply system having three or more battery units.

Figure 11:
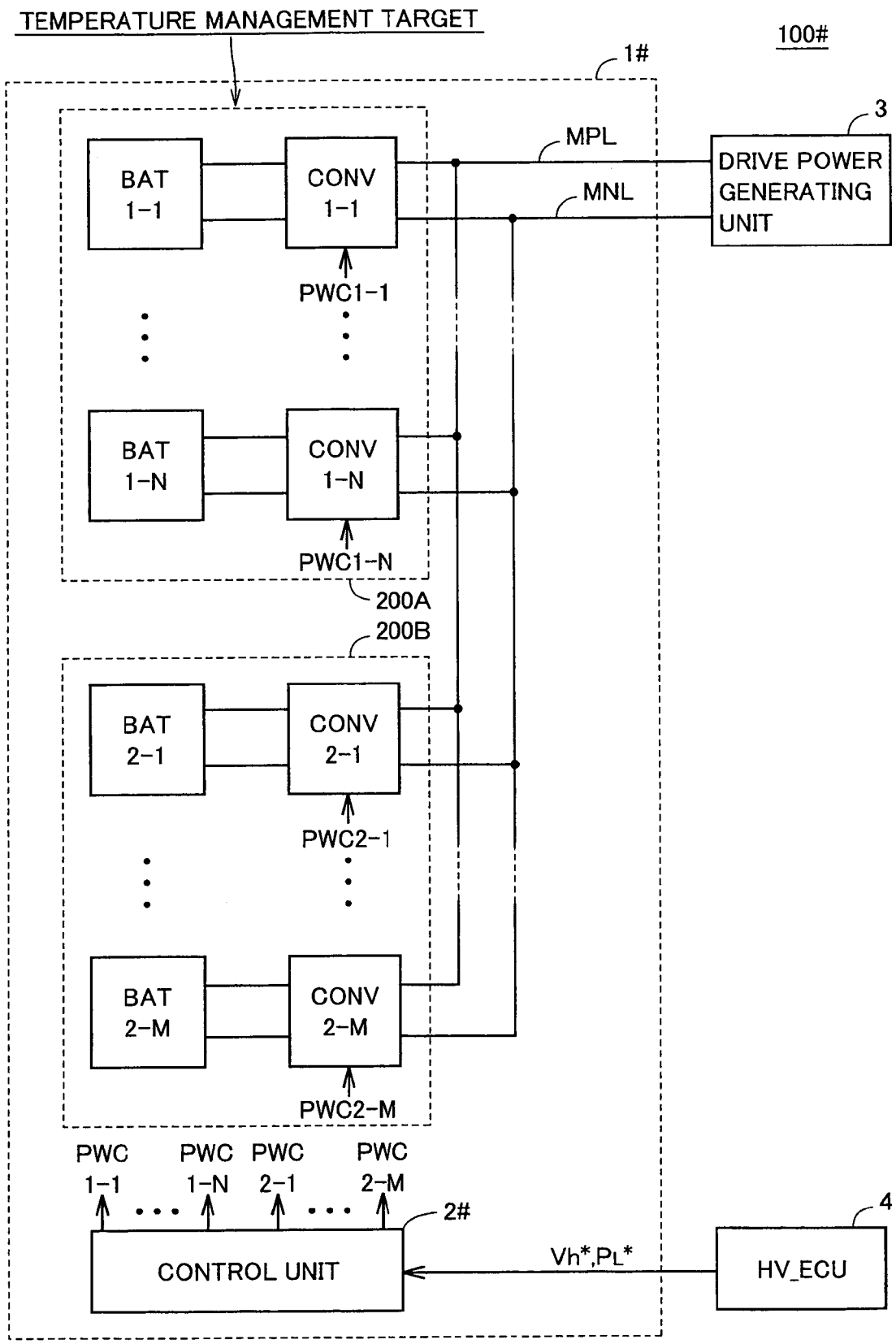
FIG. 11 schematically shows a structure of a substantial part of a vehicle provided with a power supply system according to a second modification of the embodiment of the invention.

Referring to FIG. 11, description will now be given on the schematic structure showing a substantial part of a vehicle 100# provided with a power supply system #1 according to a second modification of the embodiment of the invention.

Vehicle 100# employs a power supply system 1# instead of power supply system 1 in vehicle 100 shown in FIG. 1. Drive power generating unit 3 and HV_ECU 4 in vehicle 100# are substantially the same as those in FIG. 1, and therefore detailed description thereof is not repeated.

Power supply system 1# includes a first group power supply unit 200A that includes N sets of converters CONV1 and corresponding battery units BAT1 that are the same as those employed in power supply system 1 in FIG. 1, and also includes a second group power supply unit 200B that includes M sets of converters CONV2 and corresponding battery units BAT2 that are the same as those in FIG. 1. Similarly to power supply system 1 shown in FIG. 1, power supply system 1# includes the battery current detecting unit, battery voltage detecting unit and battery temperature detecting unit corresponding to each converter, and also includes smoothing capacitor C, supplied current detecting unit 16 and supplied voltage detecting unit 18 which are not shown in FIG. 11.

First group power supply unit 200A includes converters CONV1-1 to CONV1-N and corresponding battery units BAT1-1 to BAT1-N. Second group power supply unit 200B includes converters CONV2-1 to CONV2-M and corresponding battery units BAT2-1 to BAT2-M.

In the power supply system according to the second modification of the embodiment of the invention, one of first and second group power supply units 200A and 200B is the temperature management target. The temperature management target may be fixed in advance, or may be selected at an appropriate time according to the state of charge and the battery temperature of each battery unit. Further, the number of battery units includes in first or second group battery unit 200A or 200B may be variable.

In an example described below, first group power supply unit 200A is the temperature management target. Therefore, each of battery units BAT1-1 to BAT1-N contained in first group power supply unit 200A includes a chemical cell (e.g., lithium ion battery) having thermal reaction characteristics in which the thermal reactions caused by the charging and the discharging change between the heat generating reaction and the heat absorbing reaction. When first group power supply unit 200A is fixed as the temperature management target, it is not essential that battery units BAT2-1 to BAT2-M included in second group power supply unit 200B are the foregoing chemical cells, and may be accumulator elements such as electrical double layer capacitors.

A control unit 2# obtains the battery temperatures of battery units BAT1-1 to BAT1-N contained in first group power supply unit 200A that is the temperature management target, and determines based on the obtained battery temperatures whether the heating or cooling request is present for each of battery units BAT1-1 to BAT1-N or not. When control unit 2# determines that the heating or cooling request is present for any one of battery units BAT1-1 to BAT1-N, control unit 2# determines, based on the thermal reaction characteristics representing the correlation between the state of charge of the battery unit in question and the thermal reaction, in which one of the directions on the charge side and the discharge side the current is to be passed in this battery unit for responding to the heating or cooling request. Further, control unit 2# produces a switching instruction for passing the current through this battery unit in the determined direction, and provides it to the corresponding converter.

As described above, control unit 2# manages the temperatures of battery units BAT1-1 to BAT1-N by changing the direction of the current flow in each of battery units BAT1-1 to BAT1-N included in first group power supply unit 200A depending on the temperature of the battery unit.

Further, control unit 2# determines the target current value of the current passed through each battery unit for the temperature management, based on the battery temperature of the battery unit for which the heating or cooling request is present.

At the same time, control unit 2# produces switching instructions PWS2-1 to PWS2-M for converters CONV2-1 to 2-M included in second group power supply unit 200B for supplying the power corresponding to required power value $P_L^*$ to drive power generating unit 3. Thus, control unit 2# controls the charging/discharging of battery units BAT2-1 to BAT2-M included in second group power supply unit 200B so that the current flowing through power supply system 1 for satisfying the heating or cooling request may not affect externally from the power supply system 1 (drive power generating unit 3).

Details other than the above are substantially the same as those of the embodiment of the invention already described, and therefore description thereof is not repeated.

In the second modification of the embodiment of the invention, drive power generating unit 3 corresponds to the "load device", main positive bus line MPL and main negative bus line MNL correspond to the "power lines", and converters CONV1-1 to CONV1-N and CONV2-1 to CONV2-M correspond to the "plurality of charge/discharge control units".

According to the second modification of the embodiment of the invention, the structure having three or more battery units can achieve substantially the same effect as the embodiment of the invention. Therefore, the numbers of converters and battery units can be determined relatively flexibly in the design process according to the required power of the load device. Accordingly, it is possible to provide the power supply systems that can supply the electric power to various kinds of load devices having various sizes, and to provide the vehicles provided with such power supply systems, respectively.

In the structures of the embodiment of the invention and the modifications thereof already described, the drive power generating unit including the two motor generators is used by way of example as the load device. However, the number of the motor generators is not restricted. Further, the load device is not restricted to the drive power generating unit generating the drive power for the vehicle, and the invention can be applied to a device performing only electric power consumption as well as a device that can perform both the electric power consumption and the electric power generation.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A power supply system having a plurality of battery units each being rechargeable, and comprising:
   a power supply line allowing supply and reception of an electric power between a load device and said power supply system; and
   a plurality of charge/discharge control units arranged between said plurality of battery units and said power line, respectively, and each being capable of controlling charging/discharging of the corresponding battery unit, wherein
   said plurality of battery units includes at least one first battery unit handled as a temperature management target, and a residual second battery unit,
   said first battery unit includes a chemical cell having thermal reaction characteristics changing a thermal reaction caused by each of charging and discharging between a heat generating reaction and a heat absorbing reaction depending on a state of charge, and
   said power supply system further comprises:
   a temperature obtaining unit obtaining a temperature of said first battery unit;
   an SOC obtaining unit obtaining a state of charge of said first battery unit;
   a request producing unit producing one of a heating request and a cooling request for said first battery unit based on the temperature obtained by said temperature obtaining unit;
   a current direction determining unit determining, for the battery unit corresponding to one of said heating request and said cooling request produced by said request producing unit, in which one of a direction on a charge side and a direction on a discharge side a current is to be passed for responding to one of said heating request and said cooling request based on said thermal reaction characteristics, from the state of charge obtained by said SOC obtaining unit; and
   a control instruction producing unit providing a control instruction to each of said plurality of charge/discharge control units for passing the current in the direction determined by said current direction determining unit.

2. The power supply system according to claim 1, further comprising:
   a target current value determining unit determining, based on the temperature of said first battery unit, a target current value for passing the current on one of the charge side and the discharge side determined by said current direction determining unit.

3. The power supply system according to claim 2, wherein said control instruction producing unit provides said control instruction to said charge/discharge control unit corresponding to said first battery unit such that a current value of said first battery unit attains said target current value determined by said target current value determining unit.

4. The power supply system according to claim 3, wherein said control instruction producing unit provides said control instruction to said charge/discharge control unit corresponding to said second battery unit such that the power corresponding to a difference between a sum of the charge/discharge power of said first battery unit and a power required by said load device is supplied.

5. The power supply system according to claim 2, wherein said plurality of battery units consist of one of said first battery unit and one of said second battery unit, and
   said control instruction producing unit provides said control instruction to said charge/discharge control unit corresponding to said second battery unit such that the power corresponding to a difference between the charge/discharge power of said first battery unit corresponding to said target current value determined by said target current value determining unit and a power required from said load device is supplied.

6. The power supply system according to claim 2, wherein said target current value determining unit determines said target current value with reference to predetermined resistive heat generation characteristics representing a correlation between the current flowing through said first battery unit and a quantity of generated heat.

7. The power supply system according to claim 2, further comprising:
   a current value restricting unit restricting said target current value determined by said target current value determining unit for the purpose of keeping the output voltage of said first battery unit at or above a predetermined voltage value based on predetermined output voltage characteristics representing a correlation between the current flowing through said first battery unit and an output voltage, when said request producing unit produces said heating request.

8. The power supply system according to claim 1, wherein said first battery unit includes a lithium ion battery.

9. A vehicle comprising:
   a power supply system having a plurality of battery units each being rechargeable; and a drive power generating unit receiving an electric power from said power supply system and generating a drive power, wherein said power supply system comprising:

a power supply line allowing supply and reception of an electric power between said drive power generating unit and said power supply system, and a plurality of charge/discharge control units arranged between said plurality of battery units and said power line, respectively, and each being capable of controlling charging/discharging of the corresponding battery unit;

said plurality of battery units includes at least one first battery unit handled as a temperature management target, and a residual second battery unit;

said first battery unit includes a chemical cell having thermal reaction characteristics changing a thermal reaction caused by each of charging and discharging between a heat generating reaction and a heat absorbing reaction depending on a state of charge; and said power supply system further comprises:

a temperature obtaining unit obtaining a temperature of said first battery unit;

an SOC obtaining unit obtaining a state of charge of said first battery unit;

a request producing unit producing one of a heating request and a cooling request for said first battery unit based on the temperature obtained by said temperature obtaining unit;

a current direction determining unit determining, for the battery unit corresponding to one of heating request and said cooling request produced by said request producing unit, in which one of a direction on a charge side and a direction on a discharge side a current is to be passed for responding to one of said heating request and said cooling request based on said thermal reaction characteristics, from the state of charge obtained by said SOC obtaining unit; and a control instruction producing unit providing a control instruction to each of said plurality of charge/discharge control units for passing the current in the direction determined by said current direction determining unit.

10. The vehicle according to claim 9, wherein said power supply system further comprises a target current value determining unit determining, based on the temperature of said first battery unit, a target current value for passing the current on one of the charge side and the discharge side determined by said current direction determining unit.

11. The vehicle according to claim 10, wherein said control instruction producing unit provides said control instruction to said charge/discharge control unit corresponding to said first battery unit such that a current value of said first battery unit attains said target current value determined by said target current value determining unit.

12. The vehicle according to claim 11, wherein said control instruction producing unit provides said control instruction to said charge/discharge control unit corresponding to said second battery unit such that the power corresponding to a difference between a sum of the charge/discharge power of said first battery unit and a power required by said drive power generating unit is supplied.

13. The vehicle according to claim 10, wherein said plurality of battery units consist of one of said first battery unit and one of said second battery unit, and said control instruction producing unit provides said control instruction to said charge/discharge control unit corresponding to said second battery unit such that the power corresponding to a difference between the charge/discharge power of said first battery unit corresponding to said target current value determined by said target current value determining unit and a power required by said drive power generating unit is supplied.

14. The vehicle according to claim 10, wherein said target current value determining unit determines said target current value with reference to predetermined resistive heat generation characteristics representing a correlation between the current flowing through said first battery unit and a quantity of generated heat.

15. The vehicle according to claim 10, further comprising:

a current value restricting unit restricting said target current value determined by said target current value determining unit for the purpose of keeping the output voltage of said first battery unit at or above a predetermined voltage value based on predetermined output voltage characteristics representing a correlation between the current flowing through said first battery unit and an output voltage, when said request producing unit produces said heating request.

16. The vehicle according to claim 9, wherein said first battery unit includes a lithium ion battery.

17. A temperature managing method for a battery unit in a power supply system having a plurality of battery units each being rechargeable, wherein said power supply system includes:

a power supply line allowing supply and reception of an electric power between a load device and said power supply system; and a plurality of charge/discharge control units arranged between said plurality of battery units and said power line, respectively, and each being capable of controlling charging/discharging of the corresponding battery unit;

said plurality of battery units includes at least one first battery unit handled as a temperature management target, and a residual second battery unit, said first battery unit includes a chemical cell having thermal reaction characteristics changing a thermal reaction caused by each of charging and discharging between a heat generating reaction and a heat absorbing reaction depending on a state of charge, and said temperature managing method comprises:

a temperature obtaining step of obtaining a temperature of said first battery unit;

an SOC obtaining step of obtaining a state of charge of said first battery unit;

a request producing step of producing one of a heating request and a cooling request for said first battery unit based on the temperature obtained in said temperature obtaining step;

a current direction determining step of determining, for the battery unit corresponding to one of said heating request and said cooling request produced in said request producing step, in which one of a direction on a charge side and a direction on a discharge side a current is to be passed for responding to one of said heating request and said cooling request based on said thermal reaction characteristics, from the state of charge obtained in said SOC obtaining step; and a control instruction producing step of providing a control instruction to each of said plurality of charge/discharge control units for passing the current in the direction determined in said current direction determining step.

18. The temperature managing method according to claim 17, further comprising:

a target current value determining step of determining, based on the temperature of said first battery unit, a target current value for passing the current on one of the charge side and the discharge side determined in said current direction determining step.

19. The temperature managing method according to claim 18, wherein said control instruction producing step provides said control instruction to said charge/discharge control unit corresponding to said first battery unit such that a current value of said first battery unit attains said target current value determined in said target current value determining step.

20. The temperature managing method according to claim 19, wherein said control instruction producing step includes providing said control instruction to said charge/discharge control unit corresponding to said second battery unit such that the power corresponding to a difference between a sum of the charge/discharge power of said first battery unit and a power required by said load device is supplied.

21. The temperature managing method according to claim 18, wherein said plurality of battery units consist of one of said first battery unit and one of said second battery unit, and said control instruction producing step includes providing said control instruction to said charge/discharge control unit corresponding to said second battery unit such that the power corresponding to a difference between the charge/discharge power of said first battery unit corresponding to said target current value determined in said target current value determining step and a power required by said load device is supplied.

22. The temperature managing method according to claim 18, wherein said target current value determining step includes determining said target current value with reference to predetermined resistive heat generation characteristics representing a correlation between the current flowing through said first battery unit and a quantity of generated heat.

23. The temperature managing method according to claim 18, further comprising:

a current value restricting step of restricting said target current value determined in said target current value determining step for the purpose of keeping the output voltage of said first battery unit at or above a predetermined voltage value based on predetermined output voltage characteristics representing a correlation between the current flowing through said first battery unit and an output voltage, when said request producing step produces said heating request.

* * * * *